United States Patent
Kunihiro et al.

(10) Patent No.: US 10,167,013 B2
(45) Date of Patent: Jan. 1, 2019

(54) DRIVING SUPPORT DEVICE FOR VEHICLE INCLUDING AN ELECTRIC POWER STEERING CONTROL THAT GENERATES A STEERING ASSIST TORQUE

(71) Applicant: TOYOTA JIDOSHA KABUSHIKI KAISHA, Toyota-shi, Aichi-ken (JP)

(72) Inventors: Yoji Kunihiro, Susono (JP); Yoshio Kudo, Machida (JP); Takahiro Kojo, Gotenba (JP); Yoshiaki Suzuki, Shizuoka-ken (JP); Masao Ueyama, Mishima (JP); Takeshi Goto, Toyota (JP); Yukihide Kimura, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 151 days.

(21) Appl. No.: 15/262,245

(22) Filed: Sep. 12, 2016

(65) Prior Publication Data

US 2017/0088166 A1     Mar. 30, 2017

(30) Foreign Application Priority Data

Sep. 25, 2015  (JP) ................................ 2015-188868

(51) Int. Cl.
  *B62D 6/00*   (2006.01)
  *B62D 5/04*   (2006.01)
  *B62D 15/02*  (2006.01)

(52) U.S. Cl.
  CPC .......... *B62D 6/002* (2013.01); *B62D 5/0463* (2013.01); *B62D 15/025* (2013.01)

(58) Field of Classification Search
  CPC . B62D 6/00; B62D 6/002; B62D 6/08; B62D 6/10; B62D 5/00; B62D 5/046;
  (Continued)

(56) References Cited

U.S. PATENT DOCUMENTS 6,053,270 A * 4/2000 Nishikawa .......... B60R 21/2037
                                                        180/168
6,212,452 B1  4/2001 Shimizu et al.
(Continued)

FOREIGN PATENT DOCUMENTS

JP    11-078936 A    3/1999
JP   2007-326447 A  12/2007
(Continued)

*Primary Examiner* — Richard A Goldman
(74) *Attorney, Agent, or Firm* — Sughrue Mion, PLLC

(57) ABSTRACT

A driving support device may be configured to calculate a target steering angle for allowing a vehicle to travel along a target course; set, as a reference steering angle, a steering angle when a difference between the steering angle and the target steering angle is small; calculate an indication value indicating intention of a driver's steering operation as a sum of a first product of a corrected steering angle and a steering torque, a second product of a derivative of the corrected steering angle and the steering torque, and a third product of the corrected steering angle and a derivative of the steering torque; and correct the target steering angle based on the indication value so that a target driving support torque is corrected in accordance with the intention of the driver's steering operation.

20 Claims, 22 Drawing Sheets

(58) Field of Classification Search
CPC ............... B62D 5/0463; B62D 15/025; B62D 15/0255; B62D 15/026; B62D 15/0235; B62D 15/024
USPC .............................. 701/41, 42, 31.4; 180/168
See application file for complete search history.

(56) References Cited

U.S. PATENT DOCUMENTS

| | | | |
|---|---|---|---|
| 9,656,686 B2* | 5/2017 | Kunihiro | B62D 5/0463 |
| 2005/0273236 A1* | 12/2005 | Mori | B60T 8/1755 701/41 |
| 2009/0171533 A1 | 7/2009 | Kataoka | |
| 2009/0240389 A1* | 9/2009 | Nomura | B62D 5/046 701/31.4 |
| 2012/0123643 A1 | 5/2012 | Limpibuntering et al. | |
| 2013/0041557 A1* | 2/2013 | Endo | B62D 6/002 701/42 |
| 2013/0096778 A1* | 4/2013 | Goto | B62D 5/008 701/41 |
| 2013/0190988 A1* | 7/2013 | Limpibunterng | B62D 5/008 701/42 |
| 2015/0266501 A1* | 9/2015 | Kojo | B62D 5/0463 701/41 |
| 2015/0274201 A1* | 10/2015 | Kunihiro | B62D 5/0463 701/41 |
| 2016/0107679 A1* | 4/2016 | Kimura | B62D 5/0463 701/42 |
| 2016/0200354 A1* | 7/2016 | Kimura | B62D 5/0472 701/42 |
| 2017/0088166 A1* | 3/2017 | Kunihiro | B62D 5/0463 |

FOREIGN PATENT DOCUMENTS

| | | |
|---|---|---|
| JP | 2011-031769 A | 2/2011 |
| WO | 2014/087546 A1 | 6/2014 |

* cited by examiner

DRIVING SUPPORT DEVICE FOR VEHICLE INCLUDING AN ELECTRIC POWER STEERING CONTROL THAT GENERATES A STEERING ASSIST TORQUE

INCORPORATION BY CROSS REFERENCE TO RELATED APPLICATIONS

Pursuant to 35 U.S.C. § 119(a), this application claims the benefit of earlier filing date and right of priority to Japanese Patent Application No. 2015-188868 filed on Sep. 25, 2015, the contents of which, including the specification, drawings and abstract, are incorporated herein by reference in its entirety.

BACKGROUND

1. Field

The present disclosure relates to a driving support device for a vehicle, which is configured to control a trajectory of the vehicle.

2. Description of the Related Art

A driving support device configured to control a trajectory of a vehicle includes: a driving support control device configured to calculate a target steering angle for allowing a vehicle to travel along a target course; an electric power steering device configured to generate a steering assist torque; and an electric power steering control device configured to control the electric power steering device. The electric power steering control device is configured to calculate a target driving support torque for causing a steering angle to attain the target steering angle, and to control the electric power steering device so that a driving support torque attains the target driving support torque. Through control of the driving support torque, steering angles of steered wheels are controlled to attain target steering angles for allowing the vehicle to travel along the target course.

For example, in Japanese Patent Application Laid-open No. 2007-326447, there is described a driving support device configured to support steering of a vehicle so that the vehicle travels along a set target course, and to correct the target course when a steering operation input value input by a driver is a predetermined reference value or more. With this kind of driving support device, the driver can correct the target course to his or her intended course by performing a steering operation of the predetermined reference value or more that surpasses support steering by the driving support device.

In a driving support device, a target driving support torque for causing a steering angle to attain a target steering angle is calculated by an electric power steering control device, and an electric power steering device is controlled so that a driving support torque attains the target driving support torque. The driving support torque acts to urge steered wheels to cause its steering angles to attain target steering angles corresponding to the target steering angles so that a vehicle travels along a target course set, for example, as a center of a traveling lane.

Under the situation in which the steering angles of the steered wheels are controlled through control of the driving support torque so that the vehicle travels along the center of the traveling lane, the driver may try to cause the vehicle to travel along a path that is shifted leftward or rightward with respect to the center of the traveling lane without changing the target course targeted by the driving support. However, even when the driver steers the vehicle to satisfy his or her intention, the steering angles of the steered wheels are returned or maintained by the driving support torque to the steering angles in which the vehicle travels along the center of the traveling lane. As a result, the intention of the driver is not satisfied.

In the driving support device of the type described in Japanese Patent Application Laid-open No. 2007-326447, when the driver further steers the vehicle so that the vehicle travels in accordance with his or her intention, the magnitude of the steering operation becomes larger than a predetermined reference value, with the result that the target course itself is corrected. Further, the predetermined reference value of a steering operation for correcting the target course needs to be set to a large value in order to prevent the target course from being corrected unnecessarily. However, when the predetermined reference value is set to a large value, the magnitude of the steering operation becomes more unlikely to exceed the predetermined reference value. As a result, when the driver tries to change the traveling lane to, for example, a branch lane, the correction of the target course is delayed. Thus, even when the driver tries to change the traveling lane to, for example, a branch lane, the vehicle is maintained to travel along the target course.

SUMMARY

It is an object of the present disclosure to provide a driving support device configured to control a driving support torque based on a target steering angle targeted by the driving support device, which satisfies an intention of a driver who tries to cause a vehicle to travel along a path that is shifted leftward or rightward with respect to a target course targeted by the driving support device without changing the target course.

According to an exemplary embodiment of the present disclosure, there is provided a driving support device for a vehicle. The driving support device may include: a steering angle detection device configured to detect a steering angle ($\theta$); a steering torque detection device configured to detect a steering torque ($T$); a driving support control device configured to calculate a target steering angle ($\theta t$) corresponding to target steering angles of steered wheels of the vehicle for allowing the vehicle to travel along a target course; an electric power steering device configured to generate a steering assist torque ($Ta$); and an electric power steering control device for controlling the electric power steering device, the electric power steering control device configured to calculate a target driving support torque ($Tdt$) for causing the steering angle ($\theta$) to attain the target steering angle ($\theta t$), to thereby control the electric power steering device so that a driving support torque ($Td$) attains the target driving support torque ($Tdt$).

The electric power steering control device may be configured to: set, as a reference steering angle ($\theta s$), one of the target steering angle ($\theta t$) and the steering angle ($\theta$) acquired when a magnitude of a difference ($\theta-\theta t$) between the steering angle ($\theta$) and the target steering angle ($\theta t$) is estimated to be less than a reference value ($\theta 0$); calculate a corrected steering angle ($\theta-\theta s$) by subtracting the reference steering angle ($\theta s$) from the steering angle ($\theta$); calculate an indication value ($Idsi$) indicating an intention of a driver's steering operation, which is correlated to at least one of a first product (($\theta-\theta s$)*$T$) of the corrected steering angle ($\theta-\theta s$) and the steering torque ($T$), a second product ($d\theta$*$T$) of a time derivative ($d\theta$) of the corrected steering angle ($\theta-\theta s$) and the steering torque ($T$), and a third product (($\theta-\theta s$)*$dT$) of the corrected steering angle ($\theta-\theta s$) and a time derivative ($dT$) of the steering torque ($T$); and correct the target steering angle ($\theta$t) based on the indication value (Idsi) so that the target driving support torque (Tdt) is corrected in accordance with the intention of the driver's steering operation.

The steering angle detection device and the steering torque detection device may be configured to detect the steering angle and the steering torque, respectively, with a neutral position corresponding to straight ahead traveling of the vehicle being 0, a value of one steering direction being positive, and a value of the other steering direction being negative. Thus, as described, for example, in International Patent WO2014/087546A1 according to the application by the applicant of the present disclosure, the product of the steering angle and the steering torque, and the product of a time derivative of one of the steering angle and the steering torque and the other, indicate the intention of the driver's steering operation, that is, whether the steering is active steering or passive steering, and also indicate a degree thereof.

However, under a situation in which the vehicle is steered to travel along the target course by the driving support device, the steering angle contains an amount thereof that is controlled by the driving support device. Thus, it is not possible to appropriately determine the intention of the driver's steering operation through use of the steering angle that is detected with the neutral position being 0. Steering by the driver needs to be detected distinctively from steering by the driving support device in order to appropriately determine the intention of the driver's steering operation under the driving support device. The steering angle acquired when the driver has no objection to steering by the driving support device needs to be set as a reference rather than the neutral position, namely, 0, in order to detect steering by the driver distinctively from steering by the driving support device.

In the configuration described above, one of the target steering angle ($\theta$t) and the steering angle ($\theta$) acquired when the magnitude of the difference ($\theta-\theta$t) between the steering angle ($\theta$) and the target steering angle ($\theta$t) is estimated to be less than the reference value ($\theta$0) is set as the reference steering angle ($\theta$s). The corrected steering angle ($\theta-\theta$s) to be used for calculating the indication value (Idsi) indicating the intention of the driver's steering operation is calculated by subtracting the reference steering angle ($\theta$s) from the steering angle ($\theta$). The magnitude of the difference ($\theta-\theta$t) between the steering angle and the target steering angle is less than the reference value when the driver has no objection to steering by the driving support device. Thus, the corrected steering angle ($\theta-\theta$s) is a steering angle that is detected with the steering angle acquired when the driver has no objection to steering by the driving support device being set as the reference.

Further, as described above, the steering angle detection device may be configured to detect the steering angle with the neutral position corresponding to straight ahead traveling of the vehicle being 0, the value of one steering direction being positive, and the value of the other steering direction being negative. However, a so-called neutral position deviation sometimes occurs in the steering angle detection device. That is, the steering angle of 0 and the neutral position sometimes do not match with each other. When a neutral position deviation occurs, the detected steering angle ($\theta$) contains a steady-state error, but the reference steering angle ($\theta$s) also contains the same steady-state error. Thus, even when a neutral position deviation occurs in the steering angle detection device, the corrected steering angle ($\theta-\theta$s) is not influenced by the steady-state error.

In the configuration described above, the indication value (Idsi) indicating the intention of the driver's steering operation is calculated as a value that is correlated to at least one of the first product (($\theta-\theta$s)*T) of the corrected steering angle ($\theta-\theta$s) and the steering torque (T), the second product (d$\theta$*T) of the time derivative (d$\theta$) of the corrected steering angle and the steering torque (T), and the third product (($\theta-\theta$s)*dT) of the corrected steering angle and the time derivative (dT) of the steering torque (T). Thus, the indication value (Idsi) appropriately indicating the intention of the driver's steering operation can be calculated based on the steering angle that is detected with the steering angle acquired when the driver has no objection to steering by the driving support device being set as the reference. Further, even when the steering angle ($\theta$) and the reference steering angle ($\theta$s) contain the steady-state error, it is possible to calculate the indication value (Idsi) appropriately indicating the intention of the driver's steering operation without being influenced by the error.

Further, in the configuration described above, the target steering angle ($\theta$t) corresponding to the target steering angles of the steered wheels for allowing the vehicle to travel along the target course is calculated, and the target driving support torque (Tdt) for causing the steering angle ($\theta$) to attain the target steering angle ($\theta$t) is calculated. The target steering angle ($\theta$t) is corrected based on the indication value (Idsi) so that the target driving support torque (Tdt) is corrected in accordance with the intention of the driver's steering operation.

Thus, it is possible to correct the steering angle ($\theta$t) so that the target driving support torque (Tdt) is appropriately corrected in accordance with the intention of the driver's steering operation without changing the target course targeted by the driving support device. Therefore, it is possible to satisfy the intention of the driver to cause the vehicle to travel along a path that is shifted leftward or rightward with respect to the target course without changing the target course targeted by the driving support device.

The reference steering angle ($\theta$s) may be set to one of the target steering angle ($\theta$t) and the steering angle ($\theta$) acquired when the difference ($\theta-\theta$t) between the steering angle ($\theta$) and the target steering angle ($\theta$t) is estimated to be 0. However, the difference ($\theta-\theta$t) is not estimated to be 0 unless a time when the steering angle ($\theta$) is equal to the target steering angle ($\theta$t) and a time of estimation are the same. Thus, one of the target steering angle ($\theta$t) and the steering angle ($\theta$) acquired when the magnitude of the difference ($\theta-\theta$t) between the steering angle ($\theta$) and the target steering angle ($\theta$t) is estimated to be less than the reference value ($\theta$0) is set as the reference steering angle ($\theta$s).

Further, "active steering" relating to the intention of the driver's steering operation means actively steering the vehicle so that the driver changes the traveling direction of the vehicle. The "active steering" in the present disclosure includes "holding", that is, holding a steering input apparatus, e.g., a steering wheel, at a certain steering operation position (holding steering) or maintaining the steering input apparatus at a neutral position (maintaining a neutral position). In contrast, "passive steering" means a steering operation to be performed by the driver when a displacement of the steering input apparatus changes due to an input from a road surface or steering of the steered wheels by the driving support device, which follows the change of the displacement so as not to disturb the change in displacement of the steering input apparatus.

Aspects of the Present Disclosure

In one aspect of the present disclosure, the electric power steering control device may be configured to: calculate, based on the indication value (Idsi), a correction amount (Δθt) of the target steering angle (θt) for correcting the target driving support torque (Tdt) in accordance with the intention of the driver's steering operation; and calculate the target driving support torque (Tdt) based on a target steering angle (θta) acquired by correcting the target steering angle (θt) with the correction amount (Δθt).

In the above-mentioned aspect, the correction amount (Δθt) of the target steering angle (θt) for correcting the target driving support torque (Tdt) in accordance with the intention of the driver's steering operation is calculated based on the indication value (Idsi), and the target driving support torque (Tdt) is calculated based on the target steering angle (θta) acquired by correcting the target steering angle (θt) with the correction amount (Δθt). Thus, it is possible to correct the target steering angle (θt) with the correction amount (Δθt) calculated based on the indication value (Idsi), to thereby reflect the intention of the driver's steering operation in the target driving support torque (Tdt) based on the corrected target steering angle (θta).

In another aspect of the present disclosure, the indication value (Idsi) may be a weighted sum of at least two of the first product ((θ−θs)*T), the second product (dθ*T), and the third product ((θ−θs)*dT).

In the above-mentioned aspect, the indication value (Idsi) is the weighted sum of at least two of the first product ((θ−θs)*T), the second product (dθ*T), and the third product ((θ−θs)*dT). Thus, it is possible to more appropriately reflect the intention of the driver's steering operation in the target driving support torque compared to the case of the indication value being any one of the first product, the second product, and the third product. Further, it is possible to more appropriately reflect the intention of the driver's steering operation in the target driving support torque with at least one of the first product, the second product, or the third product being given a larger weight than the others compared to the case of the indication value being only a sum of at least two of the first product, the second product, and the third product.

The first product ((θ−θs)*T) does not contain the time derivative of the steering angle and the time derivative of the steering torque, and thus is an indication value indicating an intention of the driver for steady-state steering. In contrast, the second product (dθ*T) contains the time derivative of the steering angle and the third product ((θ−θs)*dT) contains the time derivative of the steering torque, and thus the second and third products are each an indication value indicating an intention of the driver for transitional steering. Thus, at least two of the first product, the second product, and the third product may include the first product ((θ−θs)*T) and at least one of the second product (dθ*T) or the third product ((θ−θs)*dT), with the result that the indication value (Idsi) indicates both of the intention of the driver for steady-state steering and the intention of the driver for transitional steering.

Further, in another aspect of the present disclosure, the electric power steering control device may be configured to: estimate an insufficient driving support torque (Tds), which corresponds to a difference between a driving support torque (Treq) required for allowing the vehicle to travel along the target course and an actual driving support torque (Td) having a magnitude of the driving support torque (Treq) or less; and calculate at least one of a corrected first product ((θ−θs)(T−Tds)), a corrected second product (dθ*(T−Tds)), and a corrected third product ((θ−θs)*dT) as alternative values for the first product, the second product, and the third product, respectively, based on a corrected steering torque (T−Tds) and the corrected steering angle (θ−θs), the corrected steering torque (T−Tds) being acquired by subtracting the insufficient driving support torque (Tds) from the steering torque (T).

There is a limitation on an amount of the steering assist torque that can be generated by the electric power steering device, and thus there is also a limitation on the driving support torque (Td). Thus, when the magnitude of the driving support torque (Treq) required for allowing the vehicle to travel along the target course is large, the magnitude of the actual driving support torque (Td) is sometimes smaller than the magnitude of the required driving support torque (Treq). In this kind of situation, the driver supplements an insufficient driving support torque, namely, the insufficient driving support torque (Tds) equivalent to the difference between the required driving support torque (Treq) and the actual driving support torque (Td), by his or her own steering so that the vehicle travels along the target course. The insufficient driving support torque (Tds) is not a steering torque applied by the driver for causing the vehicle to travel along a path that is shifted leftward or rightward with respect to the target course. Thus, the insufficient driving support torque (Tds) needs to be excluded from the steering torque to be used for determining the intention of the driver's steering operation in order to appropriately determine the intention of the driver's steering operation under a situation in which there is the insufficient driving support torque (Tds).

In the above-mentioned aspect, at least one of the corrected first to third products is calculated as the alternative values for the first to third products, respectively, based on the corrected steering torque (T−Tds) and the corrected steering angle (θ−θs), the corrected steering torque (T−Tds) being acquired by subtracting the insufficient driving support torque (Tds) from the steering torque (T). Thus, it is possible to calculate at least one of the corrected first to third products when there is the insufficient driving support torque (Tds).

Further, in another aspect of the present disclosure, the electric power steering control device may be configured to calculate, as an alternative value for the first product ((θ−θs)*T), a weighted sum of values acquired by integrating each of the second product (dθ*T) and the third product ((θ−θs)*dT) for a time period from a time at which the magnitude of the difference (θ−θt) between the steering angles is estimated to be less than the reference value (θ0) to a current time.

As described later in detail, in place of the first product ((θ−θs)*T), it is possible to use a value acquired by integrating the sum of the second product (dθ*T) and the third product ((θ−θs)*dT) for the time period from the time at which the magnitude of the difference (θ−θt) between the steering angles is estimated to be less than the reference value (θ0) to the current time. Further, in place of the value acquired by integrating the sum of the second product (dθ*T) and the third product ((θ−θs)*dT), it is possible to weight each integral by using the weighted sum of the values acquired by integrating each of the second product (dθ*T) and the third product ((θ−θs)*dT).

In particular, the integral of the second product (dθ*T) indicates the intention for steering whose motion is manifested by rotation of a steering wheel within the intention of the driver for steady-state steering. In contrast, the integral of the third product (($\theta-\theta s$)*dT) indicates the intention for steering whose motion is not manifested by rotation of the steering wheel within the intention of the driver for steady-state steering.

In the above-mentioned aspect, the weighted sum of the values acquired by integrating each of the second product (d$\theta$*T) and the third product (($\theta-\theta s$)*dT) is calculated as an alternative value for the first product (($\theta-\theta s$)*T). Thus, it is possible to weight the intention for steering whose motion is manifested and the intention for steering whose motion is not manifested, to thereby appropriately reflect the intention of the driver's steering operation in the target driving support torque.

Further, in another aspect of the present disclosure, the electric power steering control device may be configured to calculate, as an alternative value for the corrected first product (($\theta-\theta s$)(T–Tds)), a weighted sum of values acquired by integrating each of the corrected second product (d$\theta$*(T–Tds)) and the corrected third product (($\theta-\theta s$)*dT) for a time period from a time at which the magnitude of the difference ($\theta-\theta t$) between the steering angles is estimated to be less than the reference value ($\theta 0$) to a current time.

As described later in detail, in place of the corrected first product (($\theta-\theta s$)(T–Tds)), it is possible to use the value acquired by integrating the sum of the corrected second product (d$\theta$*(T–Tds)) and the corrected third product (($\theta-\theta s$)*dT) for the time period from the time at which the magnitude of the difference ($\theta-\theta t$) between the steering angles is estimated to be less than the reference value ($\theta 0$) to the current time. Further, in place of the value acquired by integrating the sum of the corrected second product (d$\theta$*(T–Tds)) and the corrected third product (($\theta-\theta s$)*dT), it is possible to weight each integral by using the weighted sum of the values acquired by integrating each of the corrected second product (d$\theta$*(T–Tds)) and the corrected third product (($\theta-\theta s$)*dT).

In particular, the integral of the corrected second product (d$\theta$*(T–Tds)) indicates the intention for steering whose motion is manifested by rotation of the steering wheel within the intention of the driver for steady-state steering. In contrast, the integral of the corrected third product (($\theta-\theta s$)*dT) indicates the intention for steering whose motion is not manifested by rotation of the steering wheel within the intention of the driver for steady-state steering.

Further, the steering torque (T–Tds) of the corrected second product (d$\theta$*(T–Tds)) is the corrected steering torque acquired by subtracting the insufficient driving support torque (Tds) from the steering torque (T). The time derivative (dT) of the steering torque of the corrected third product (($\theta-\theta s$)*dT) is a time derivative of the corrected steering torque acquired by subtracting the insufficient driving support torque (Tds) from the steering torque (T). Thus, both of the integral of the corrected second product (d$\theta$*(T–Tds)) and the integral of the corrected third product (($\theta-\theta s$)*dT) are values that are not influenced by the steering torque supplemented by the driver to allow the vehicle to travel along the target course.

In the above-mentioned aspect, the weighted sum of the values acquired by integrating each of the corrected second product (d$\theta$*(T–Tds)) and the corrected third product (($\theta-\theta s$)*dT) is calculated as the alternative value for the corrected first product (($\theta-\theta s$)(T–Tds)). Thus, it is possible to weight the intention for steering whose motion is manifested and the intention for steering whose motion is not manifested, to thereby appropriately reflect the intention of the driver's steering operation in the target driving support torque. Further, it is possible to appropriately reflect the intention of the driver's steering operation in the target driving support torque without being influenced by the steering torque supplemented by the driver to allow the vehicle to travel along the target course.

Further, in another aspect of the present disclosure, the electric power steering control device may be configured to set, as the reference steering angle ($\theta s$), one of the target steering angle ($\theta t$) and the steering angle ($\theta$) acquired when a situation in which the magnitude of the difference ($\theta-\theta t$) between the steering angles is estimated to be less than the reference value ($\theta 0$) has continued for a predetermined time period or more.

In the above-mentioned aspect, it is possible to more accurately determine the situation in which the driver has no objection to steering by the driving support device and set the reference steering angle ($\theta s$) compared to a case in which one of the target steering angle ($\theta t$) and the steering angle ($\theta$) acquired when the magnitude of the difference ($\theta-\theta t$) between the steering angles is estimated to be less than the reference value ($\theta 0$) is set as the reference steering angle ($\theta s$).

Further, in another aspect of the present disclosure, the electric power steering control device may be configured to set, as the reference steering angle ($\theta s$), one of the target steering angle ($\theta t$) and the steering angle ($\theta$) acquired when a situation in which the magnitude of the difference ($\theta-\theta t$) between the steering angles is estimated to be less than the reference value ($\theta 0$) and a magnitude of the difference (T–Tds) between the steering torque (T) and the insufficient driving support torque (Tds) is estimated to be less than a reference value (T0) has continued for a predetermined time period or more.

A case is assumed for comparison, in which one of the target steering angle ($\theta t$) and the steering angle ($\theta$) acquired when the magnitude of the difference ($\theta-\theta t$) between the steering angles is estimated to be less than the reference value ($\theta 0$) and the magnitude of the difference between the steering torque (T) and the insufficient driving support torque (Tds) is estimated to be less than the reference value (T0) is set as the reference steering angle ($\theta s$). In the above-mentioned aspect, compared to the case for comparison, it is possible to more correctly determine the situation in which the driver has no objection to steering by the driving support device, and set the reference steering angle ($\theta s$) without being influenced by the steering torque supplemented by the driver to allow the vehicle to travel along the target course.

Further, in another aspect of the present disclosure, the electric power steering control device may be configured to limit a magnitude of a time rate of change (d$\theta s$) of the reference steering angle ($\theta s$) to a limit rate of change (d$\theta s0$) or less.

When the reference steering angle ($\theta s$) drastically changes, the indication value (Idsi) also drastically changes, and thus the target driving support torque (Tdt) unavoidably drastically changes. In the above-mentioned aspect, the magnitude of the time rate of change (d$\theta s$) of the reference steering angle ($\theta s$) is limited to the limit rate of change (d$\theta s0$) or less, and thus it is possible to prevent the drastic change of the target driving support torque (Tdt) due to the drastic change of the reference steering angle ($\theta s$).

Further, in another aspect of the present disclosure, the electric power steering control device may be configured to calculate the indication value (Idsi), which is correlated to at least one of a first weighted product (G1*Pr1) of a first weight coefficient (G1) and the first product (($\theta-\theta s$)*T), a second weighted product (G2*Pr2) of a second weight coefficient (G2) and the second product (dθ*T), and a third weighted product (G3*Pr3) of a third weight coefficient (G3) and the third product ((θ−θs)*dT). Additionally, or alternatively, the indication value (Idsi) may be correlated to a sum of the first weighted product (G1*Pr1), the second weighted product (G2*Pr2), and the third weighted product (G3*Pr3)

DETAILED DESCRIPTION OF EMBODIMENTS

First Exemplary Embodiment

Now, referring to the accompanying drawings, exemplary embodiments of the present disclosure are described in detail.

Figure 1:
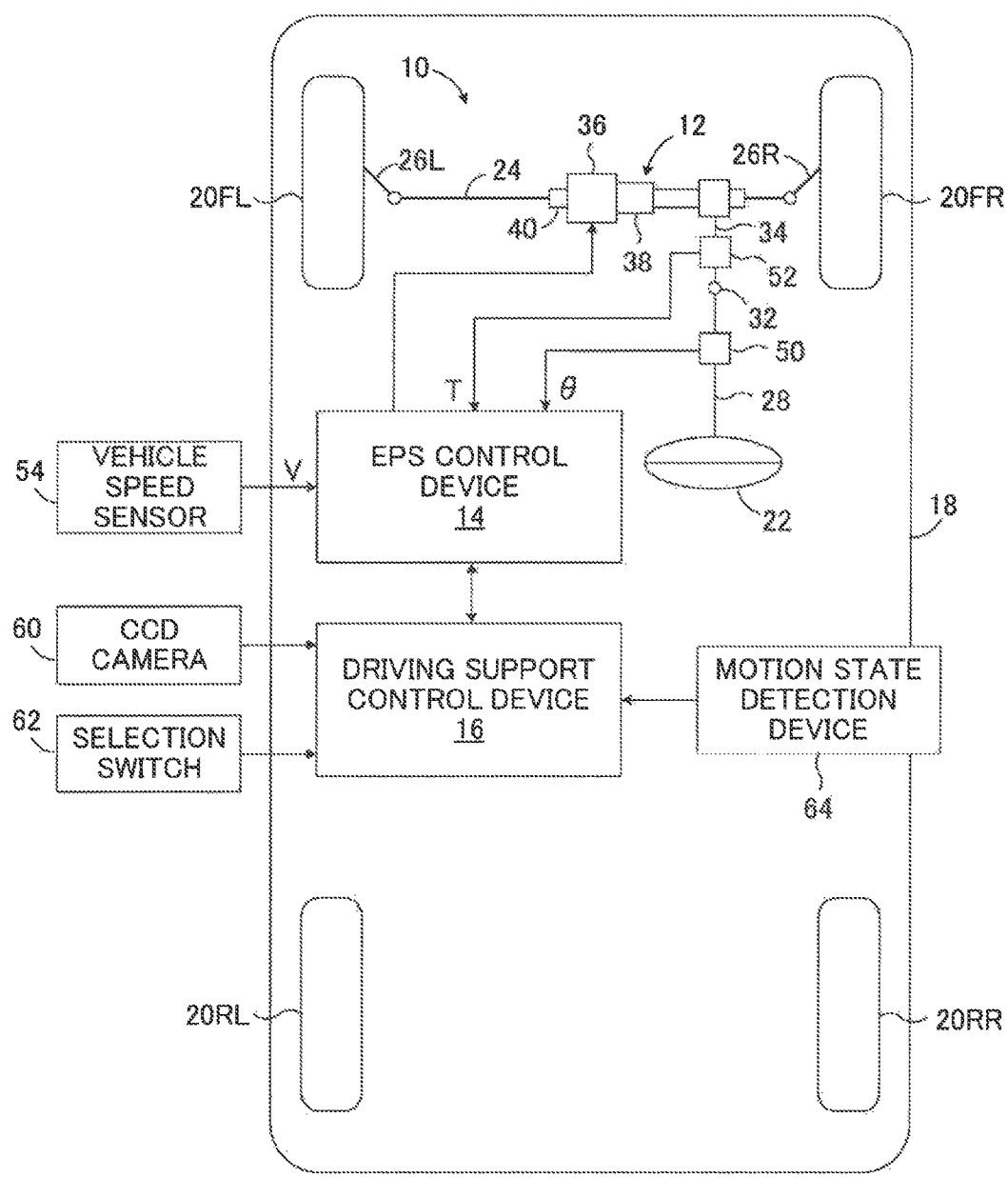
FIG. 1 is a schematic view depicting a driving support device for a vehicle according to a first exemplary embodiment of the present disclosure.

FIG. 1 is a schematic configuration diagram for illustrating a driving support device 10 according to a first exemplary embodiment of the present disclosure. The driving support device 10 includes an electric power steering (EPS) device 12, an EPS control device 14 serving as a control device configured to control the electric power steering device 12, and a driving support control device 16. The driving support device 10 is applied to a vehicle 18.

As illustrated in FIG. 1, the vehicle 18 includes front left and right wheels 20FL and 20FR, which are steered wheels, and rear left and right wheels 20RL and 20RR, which are non-steered wheels. The front wheels 20FL and 20FR are steered via a rack bar 24 and tie rods 26L and 26R by the electric power steering device 12 driven in response to an operation by a driver on a steering wheel 22. The steering wheel 22 is connected to a pinion shaft 34 of the electric power steering device 12 via a steering shaft 28 and a universal joint 32.

In the first exemplary embodiment, the electric power steering device 12 is a rack coaxial type electric power steering device, and includes a motor 36, and a conversion mechanism 38, e.g., a ball screw mechanism, configured to convert a rotational torque of the motor 36 into a force in a reciprocal direction of the rack bar 24. The electric power steering device 12 is configured to generate a force for driving the rack bar 24 relative to a housing 40, to thereby alleviate a steering load on the driver, and to generate a drive torque for automatically steering the front wheels 20FL and 20FR. A detailed description is later given of control of the electric power steering device 12 by the EPS control device 14.

As can be understood from the description given above, the steering shaft 28, the universal joint 32, the electric power steering device 12, the rack bar 24, the tie rods 26L and 26R, and the like form a steering apparatus. The electric power steering device 12 is configured to apply a torque to the steering apparatus by applying a driving force to the rack bar 24, but may instead be configured to apply a torque to the steering shaft 28.

In the first exemplary embodiment, a steering angle sensor 50 configured to detect a rotational angle of the steering shaft 28 as a steering angle $\theta$ is arranged on the steering shaft 28. A steering torque sensor 52 configured to detect a steering torque T is arranged on the pinion shaft 34. The steering torque sensor 52 may alternatively be arranged on the steering shaft 28. A signal indicating the steering angle $\theta$ and a signal indicating the steering torque T are input to the EPS control device 14. A vehicle speed sensor 54 configured to detect a vehicle speed V is arranged on the vehicle 18, and a signal indicating the vehicle speed V is also input to the EPS control device 14.

Further, on the vehicle 18, a CCD camera 60 configured to photograph a front field of view of the vehicle, and a selection switch 62 configured to select whether or not to perform trajectory control (lane keeping assist control) (referred to as "LKA control" as necessary) for allowing the vehicle to travel along a target course (target trajectory) are arranged. The selection switch 62 is configured to be operated by an occupant of the vehicle, and switch between an operation position (on) for operating the driving support control device 16 to perform the LKA control and a non-operation position (off) for preventing the driving support control device 16 from performing the LKA control. A signal indicating image information on the front field of view of the vehicle that is photographed with the CCD camera 60 and a signal indicating the position (on or off) of the selection switch 62 are input to the driving support control device 16.

Signals indicating motion state amounts of the vehicle required for the driving support control for the vehicle 18, such as a yaw rate, a longitudinal acceleration, and a lateral acceleration of the vehicle 18, are also input to the driving support control device 16 from a motion state detection device 64. In this case, the image information on the front field of view of the vehicle and information on a traveling lane may be acquired by means other than the CCD camera 60, or may be acquired by a combination of the CCD camera 60 and other means.

Each of the EPS control device 14 and the driving support control device 16 includes a microcomputer including a central processing unit (CPU), a read-only memory (ROM), a random-access memory (RAM), and an input/output port device mutually connected with one another via a bidirectional common bus. The EPS control device 14 and the driving support control device 16 mutually transmit and receive information through communication as necessary. The steering angle sensor 50 and the steering torque sensor 52 respectively detect the steering angle $\theta$ and the steering torque T with the steering for a left turn direction of the vehicle being considered as positive. The configuration of the driving support device 10 according to the first exemplary embodiment described above is also applied to those of other exemplary embodiments and modified examples described later.

As described later in detail, the EPS control device 14 is configured to control a steering assist torque through control of the electric power steering device 12 in accordance with flowcharts illustrated in FIGS. 2-5, to thereby alleviate a steering load on the driver. The driving support control device 16 is configured to calculate a target steering angle $\theta t$ for allowing the vehicle to travel along the target course in accordance with a flowchart illustrated in FIG. 6. The EPS control device 14 is configured to, under LKA control, calculate an indication value Idsi indicating an intention of the driver's steering operation, and correct the target steering angle $\theta t$ based on the indication value Idsi. Further, the EPS control device 14 is configured to control a driving support torque Td so that the steering angle $\theta$ attains the corrected target steering angle $\theta t$, to thereby allow the vehicle to travel along a course that has reflected the intention of the driver's steering operation without changing the target course under LKA control.

Under LKA control, the traveling lane is identified based on image information on the front field of view of the vehicle that is photographed with the CCD camera 60, and the target course is set as a line passing through the center of the traveling lane. Otherwise, the target course may be a line passing through a position other than the center of the traveling lane, or may be a course for preventing departure of the vehicle from the traveling lane. Further, LKA control serving as driving support control is performed when the selection switch 62 is on, but automatic steering (emergency avoidance steering) for avoiding an emergency, for example, traveling of the vehicle 18 to circumvent its front obstacle, may be performed as part of the driving support control even when the selection switch 62 is off.

<Steering Assist Torque Control>

Figure 2:
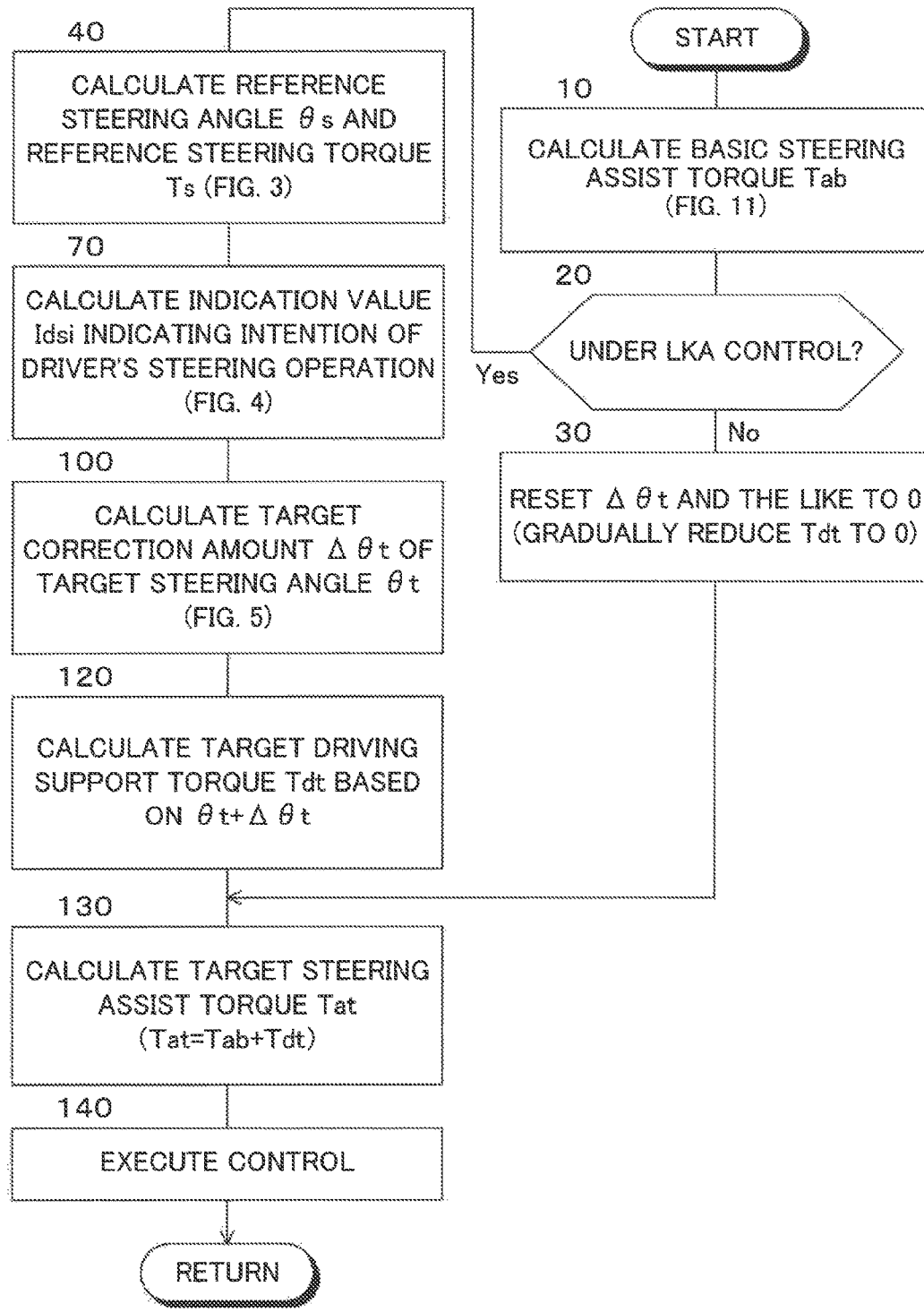
FIG. 2 is a flowchart depicting an exemplary routine for controlling a steering assist torque according to the first exemplary embodiment of the present disclosure.

Next, a description is given of an exemplary routine for controlling a steering assist torque in the first exemplary embodiment with reference to the flowchart illustrated in FIG. 2. Control based on the flowchart illustrated in FIG. 2 (including control based on the flowcharts illustrated in FIGS. 3-5 for illustrating subroutines) is simply referred to as "control".

Figure 11:
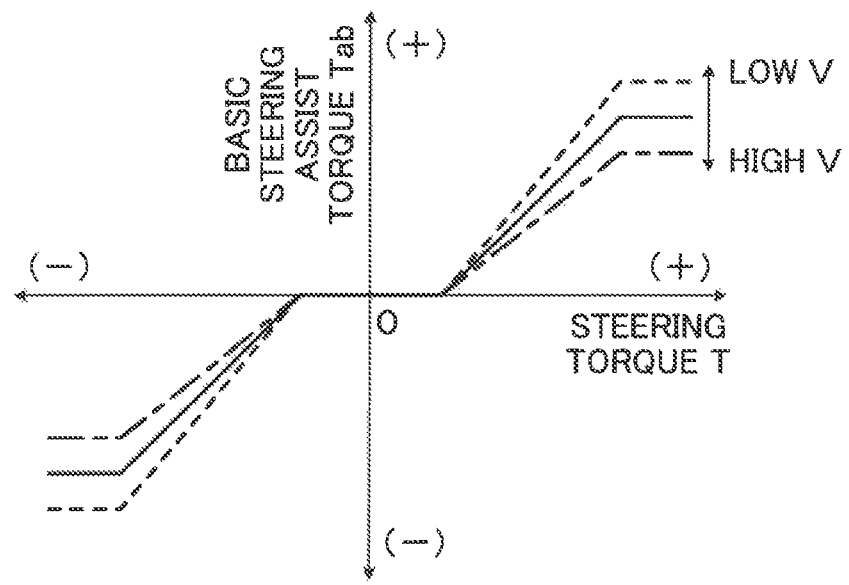
FIG. 11 is a map depicting a relationship among a steering torque T, a vehicle speed V, and a basic steering assist torque Tab.

First, in Step 10, a basic steering assist torque Tab for alleviating a steering load on the driver is calculated by referring to a map shown in FIG. 11 based on the steering torque T and the vehicle speed V. As shown in FIG. 11, the basic steering assist torque Tab is generally calculated so that the magnitude of the basic steering assist torque Tab becomes larger as the absolute value of the steering torque T becomes larger and so that the absolute value of the basic steering assist torque Tab becomes larger as the vehicle speed V becomes lower.

Prior to Step 10, a signal indicating the steering angle θ detected by the steering angle sensor 50 and the like are read. Further, when steering assist torque control is started in accordance with the flowchart illustrated in FIG. 2, a target correction amount Δθt of the target steering angle θt calculated in Step 10 and Steps 40 to 130 described later and the like are initialized to 0.

In Step 20, it is determined whether or not the calculation of the target steering angle θt is executed under LKA control by the driving support control device 16 through determination of, for example, whether the selection switch 62 is on or off. When an affirmative determination is made (Yes at Step 20), the control proceeds to Step 40, whereas when a negative determination is made (No at Step 20), the control proceeds to Step 30.

In Step 30, the target correction amount Δθt of the target steering angle θt described later and the like are reset to 0, and at the same time, when a target driving support torque Tdt described later is not 0, the magnitude of the target driving support torque Tdt is gradually reduced to 0.

In Step 40, as described later in detail, a reference steering angle θs and a reference steering torque Ts are calculated in accordance with the flowchart illustrated in FIG. 3.

In Step 70, as described later in detail, the indication value Idsi indicating the intention of the driver's steering operation is calculated in accordance with the flowchart illustrated in FIG. 4. When the indication value Idsi is a positive value, it is indicated that the intention of the driver is active steering, and as the magnitude thereof becomes larger, it is indicated that the strength of the intention for active steering becomes larger. On the other hand, when the indication value Idsi is a negative value, it is indicated that the intention of the driver is passive steering, and as the magnitude thereof becomes larger, it is indicated that the strength of the intention to follow disturbances from a load surface or steering under LKA control becomes larger. Further, when the indication value Idsi is 0, it is indicated that the driver does not have any intention as to which of the active steering and the passive steering is to be performed.

In Step 100, as described later in detail, the target correction amount Δθt of the target steering angle θt is calculated in accordance with the flowchart illustrated in FIG. 5.

In Step 120, a signal indicating the target steering angle θt is read from the driving support control device 16, and the target driving support torque Tdt is calculated based on a corrected target steering angle θta, which is a sum θt+Δθt of the target steering angle θt and the target correction amount Δθt calculated in Step 100. The target driving support torque Tdt is calculated as a proportional-integral-derivative (PID) feedback control amount that is based on a deviation (θta−θ) between the corrected target steering angle θta and the steering angle θ.

In Step 130, the sum of the basic steering assist torque Tab calculated in Step 10 and the target driving support torque Tdt calculated in Step 120 is calculated as a target steering assist torque Tat.

In Step 140, an instruction current Iepst to the electric power steering device 12 for causing an assist torque Ta to attain the target steering assist torque Tat under PID feedback control is calculated based on a deviation between the target steering assist torque Tat and the assist torque Ta. Further, the electric power steering device 12 is controlled so that the instruction current Iepst is applied to the motor 36 of the electric power steering device 12, to thereby cause the assist torque Ta to attain the target steering assist torque Tat. In this case, the target steering assist torque Tat may contain a target torque for improving the sense of steering, for example, a target friction torque.

<Calculation of Reference Steering Angle θs and Reference Steering Torque Ts>

Figure 3:
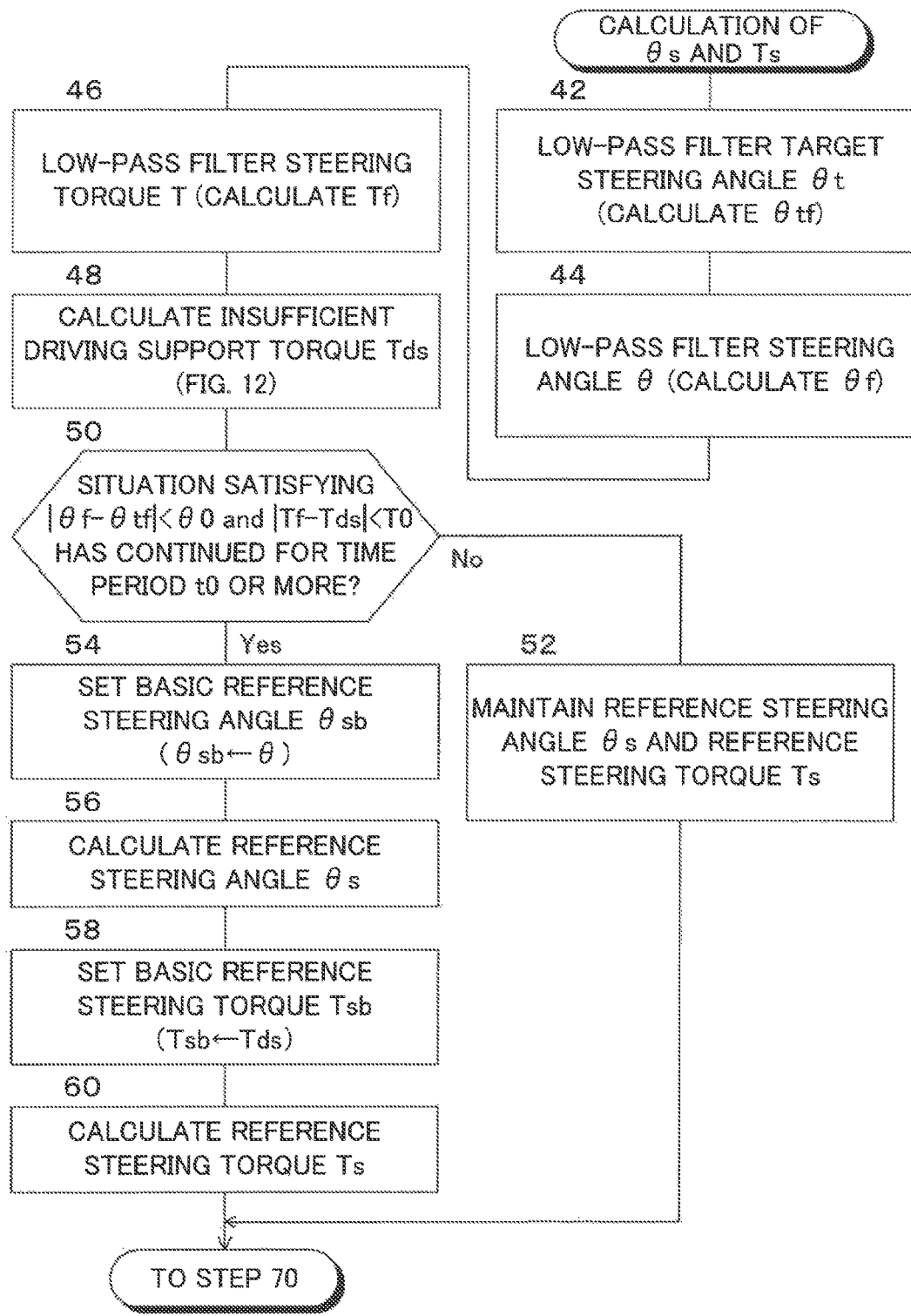
FIG. 3 is a flowchart depicting an exemplary routine for calculating a reference steering angle θs and a reference steering torque Ts according to the first exemplary embodiment of the present disclosure.

Next, a description is given of an exemplary routine for calculating the reference steering angle θs and the reference steering torque Ts in the first exemplary embodiment with reference to the flowchart illustrated in FIG. 3.

First, in Step 42, the target steering angle θt is low-pass filtered to calculate a low-pass filtered target steering angle θtf.

In Step 44, the steering angle θ is low-pass filtered to calculate a low-pass filtered steering angle θf.

In Step 46, the steering torque T is low-pass filtered to calculate a low-pass filtered steering torque Tf. The low-pass filtering in Steps 42-46 is performed to prevent drastic changes of calculation of an insufficient driving support torque Tds in Step 48 described later and the target steering angle θtf to be used for determination in Step 50 described later and the like.

Figure 12:
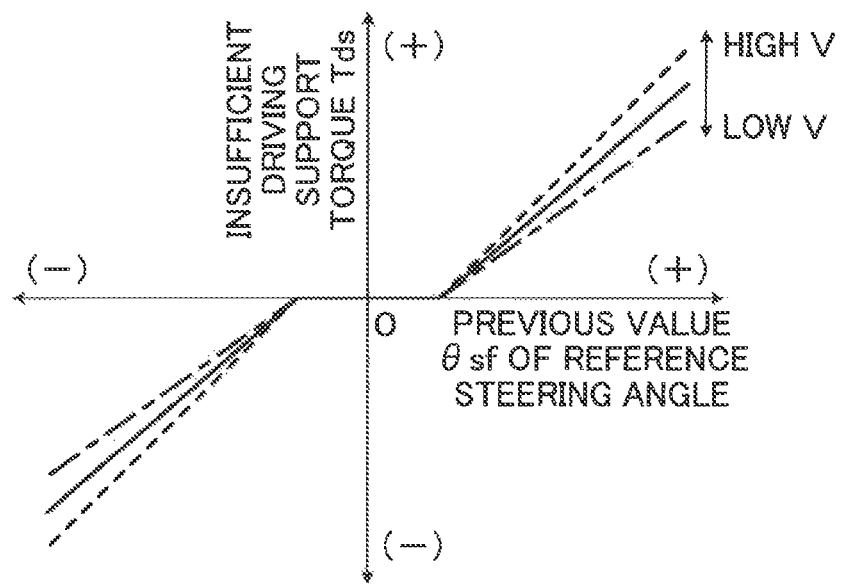
FIG. 12 is a map depicting a relationship among a previous value θsf of the reference steering angle θs, the vehicle speed V, and an insufficient driving support torque Tds.

In Step 48, the insufficient driving support torque Tds is calculated by referring to a map shown in FIG. 12 based on a previous value θsf of the reference steering angle θs and the vehicle speed V. As shown in FIG. 12, the insufficient driving support torque Tds is generally calculated so that the magnitude of the insufficient driving support torque Tds becomes larger as the absolute value of the previous value θsf becomes larger and so that the magnitude of the insufficient driving support torque Tds becomes larger as the vehicle speed V becomes higher. In this case, the insufficient driving support torque Tds is an estimated value equivalent to a difference between the magnitude of a driving support torque Treq, which is required for allowing the vehicle 18 to travel along the target course, and the magnitude of the actual driving support torque Td, which has a magnitude smaller than that of the driving support torque Treq.

In Step 50, it is determined whether a situation satisfying both of a condition (a) and a condition (b) given below has continued for a time period t0 (positive constant) or more set in advance. When a negative determination is made (No at Step 50), the control proceeds to Step 52, whereas when an affirmative determination is made (Yes at Step 50), the control proceeds to Step 54. The conditions being as follows:

(a) The absolute value of a difference between the low-pass filtered steering angle θf and the low-pass filtered target steering angle θtf is less than a reference value θ0 (positive constant close to 0).

(b) The absolute value of a difference between the low-pass filtered steering torque Tf and the insufficient driving support torque Tds is less than a reference value T0 (positive constant close to 0).

The reference steering angle θs and the reference steering torque Ts can be calculated to be more ideal values as the reference value θ0 and the reference value T0 become closer to 0. However, as the reference value θ0 and the reference value T0 become closer to 0, it is more unlikely that the timing of the reference value θ0 and the reference value T0 taking values close to 0 and the timing of determination of Step 50 match with each other. Thus, the reference value θ0 and the reference value T0 are set to values that are as close to 0 as possible and also ensure that an affirmative determination is made in Step 50 under a situation in which the absolute value of the difference between the steering angle θf and the target steering angle θtf and the absolute value of the difference between the steering torque Tf and the insufficient driving support torque Tds are both small.

In Step 52, the reference steering angle θs and the reference steering torque Ts are maintained to current values without update thereof, and when Step 52 is finished, the control proceeds to Step 70.

In Step 54, a basic reference steering angle θ sb is set to the current steering angle θ, and in Step 56, the basic reference steering angle θsb is low-pass filtered to calculate the reference steering angle θs. The low-pass filtering in Step 56 is performed to prevent a drastic change of the reference steering angle θs by limiting the magnitude of a time rate of change dθs of the reference steering angle θs to a limit rate of change dθs0 (positive constant) or less set in advance.

In Step 58, the basic reference steering torque Tsb is set to the current insufficient driving support torque Tds, and in Step 60, the basic reference steering torque Tsb is low-pass filtered to calculate the reference steering torque Ts. The low-pass filtering in Step 60 is performed to prevent a drastic change of the reference steering torque Ts by limiting the magnitude of the time rate of change of the reference steering torque Ts to the limit rate of change or less set in advance.

<Calculation of Indication Value Idsi>

Figure 4:
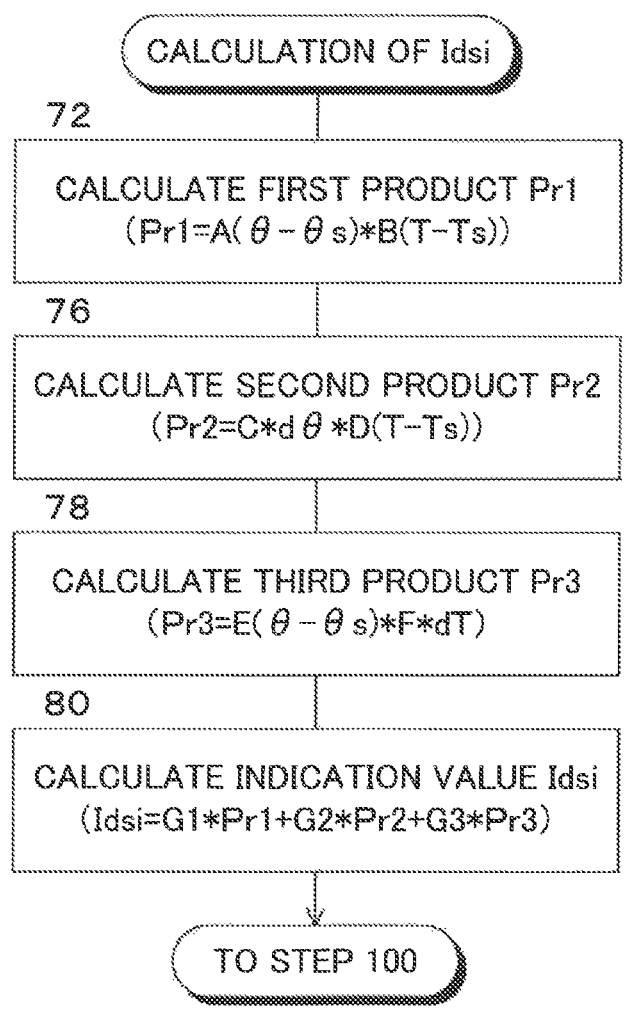
FIG. 4 is a flowchart depicting an exemplary routine for calculating an indication value Idsi according to the first exemplary embodiment of the present disclosure.

Next, a description is given of an exemplary routine for calculating the indication value Idsi in the first exemplary embodiment with reference to the flowchart illustrated in FIG. 4.

First, in Step 72, a product A(θ−θs) of a difference (θ−θs) between the steering angle θ and the reference steering angle θs, and a weight coefficient A (positive constant) is multiplied by a product B(T−Ts) of a difference (T−Ts) between the steering torque T and the reference steering torque Ts, and a weight coefficient B (positive constant) to calculate a product A(θ−θs)*B(T−Ts) as a first product Fri. The first product Fri does not contain a time derivative of the steering angle θ and a time derivative of the steering torque T, and thus is an indication value indicating an intention of the driver for steady-state steering. Further, at least one of the weight coefficients A and B may be 1.

In Step 76, a time derivative dθ of the steering angle θ is calculated, and a product C*dθ of the time derivative dθ and a weight coefficient C (positive constant) is multiplied by a product D(T−Ts) of a difference (T−Ts) between the steering torque T and the reference steering torque Ts, and a weight coefficient D (positive constant) to calculate a product C*dθ*D(T−Ts) as a second product Pr2. The second product Pr2 contains the time derivative dθ of the steering angle θ, and thus is an indication value indicating an intention of the driver for transitional steering. Further, at least one of the weight coefficients C and D may be 1.

In Step 78, a time derivative dT of the steering torque T is calculated, and a product E(θ−θs) of a difference (θ−θs) between the steering angle θ and the reference steering angle θs, and a weight coefficient E (positive constant) is multiplied by a product F*dT of the time derivative dT and a weight coefficient F (positive constant) to calculate a product E(θ−θs)*F*dT as a third product Pr3. The third product Pr3 contains the time derivative dT of the steering torque T, and thus is an indication value indicating an intention of the driver for transitional steering. Further, at least one of the weight coefficients E and F may be 1.

In Step 80, a product G1*Pr1 of the first product Pr1 and a weight coefficient G1 (positive constant), and a product G2*Pr2 of the second product Pr2 and a weight coefficient G2 (positive constant), and a product G3*Pr3 of the third product Pr3 and a weight coefficient G3 (positive constant) are added to calculate a sum (G1*Pr1+G2*Pr2+G3*Pr3) as the indication value Idsi. At least one of the weight coefficients G1-G3 may be 1.

<Calculation of Target Correction Amount Δθt>

Figure 5:
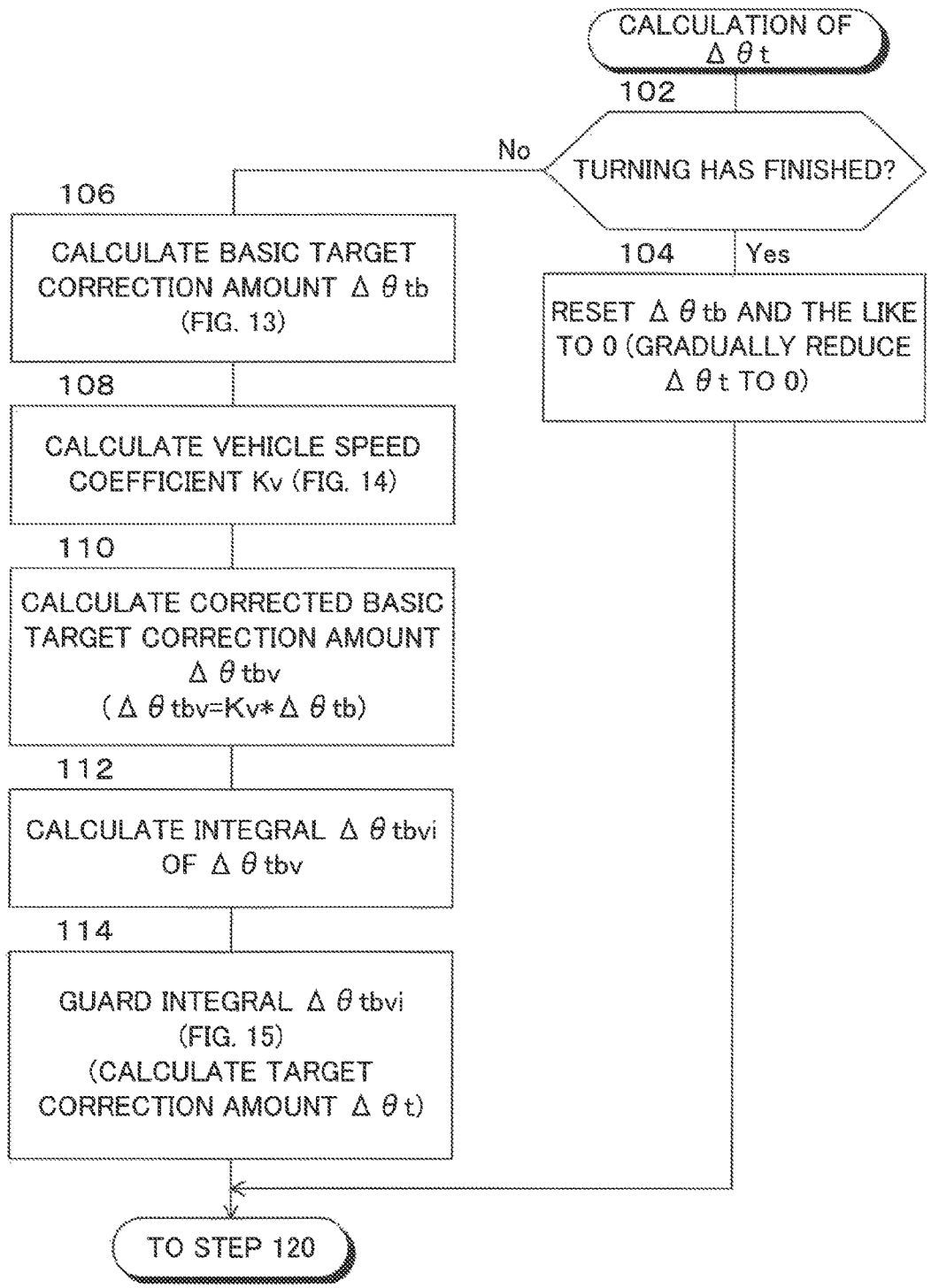
FIG. 5 is a flowchart depicting an exemplary routine for calculating a target correction amount Δθt according to the first exemplary embodiment of the present disclosure.

Next, a description is given of an exemplary routine for calculating the target correction amount Δθt in the first exemplary embodiment with reference to the flowchart illustrated in FIG. 5.

First, in Step 102, it is determined whether or not the vehicle 18 has finished turning based on, for example, the steering angle θ. When a negative determination is made (No at Step 102), the control proceeds to Step 106, whereas when an affirmative determination is made (Yes at Step 102), the control proceeds to Step 104.

In Step 104, a basic target correction amount Δθtb of the target steering angle θt calculated in Steps 106-114 described later and the like are reset to 0, and at the same time, when the target correction amount Δθt described later is not 0, the magnitude of the target correction amount Δθt is gradually reduced to 0.

Figure 13:
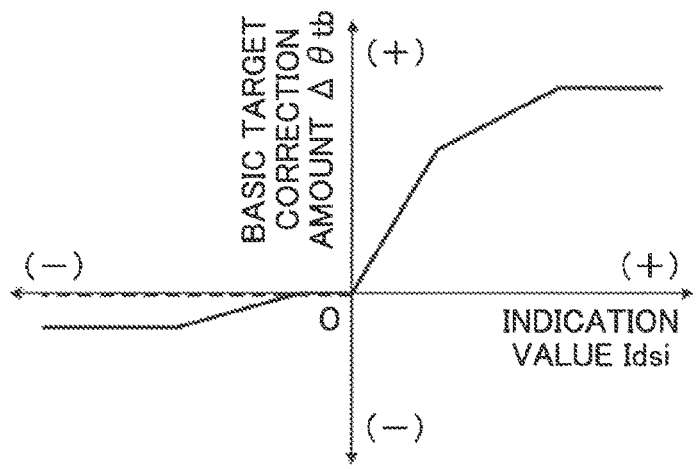
FIG. 13 is a map depicting a relationship between the indication value Idsi and a basic target correction amount Δθtb of a target steering angle θt.

In Step 106, the basic target correction amount Δθtb of the target steering angle θt is calculated by referring to a map shown in FIG. 13 based on the indication value Idsi. As shown in FIG. 13, the basic target correction amount Δθtb is calculated to be a positive value that becomes larger as the indication value Idsi becomes larger when the indication value Idsi is a positive value. On the other hand, the basic target correction amount Δθtb is calculated to be 0 when the indication value Idsi is a negative value and has a small magnitude, or calculated to be a negative value whose magnitude slightly becomes larger as the magnitude of the indication value Idsi becomes larger when the indication value Idsi is a negative value.

Figure 14:
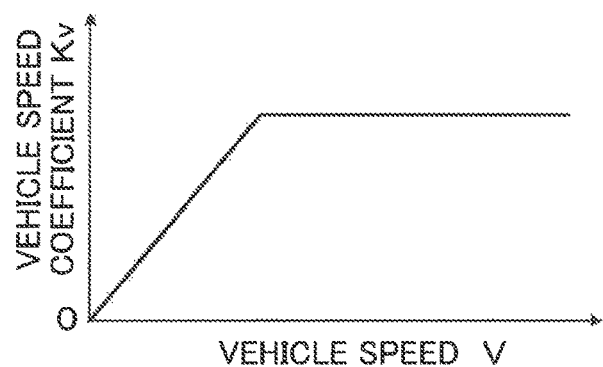
FIG. 14 is a map depicting a relationship between the vehicle speed V and a vehicle speed coefficient Kv.

In Step 108, a vehicle speed coefficient Kv is calculated by referring to a map shown in FIG. 14 based on the vehicle speed V. As shown in FIG. 14, the vehicle speed coefficient Kv becomes larger as the vehicle speed V becomes higher in a low speed range, or is calculated to be a constant value irrespective of the vehicle speed V in a medium-and-high speed range.

In Step 110, a product Kv*Δθtb of the basic target correction amount Δθtb of the target steering angle θt and the vehicle speed coefficient Kv is calculated as a corrected basic target correction amount Δθtbv.

In Step 112, a time integral Δθtbvi of the corrected basic target correction amount Δθtbv is calculated for a time period from a time at which the vehicle 18 is determined to have started turning to the current time.

Figure 15:
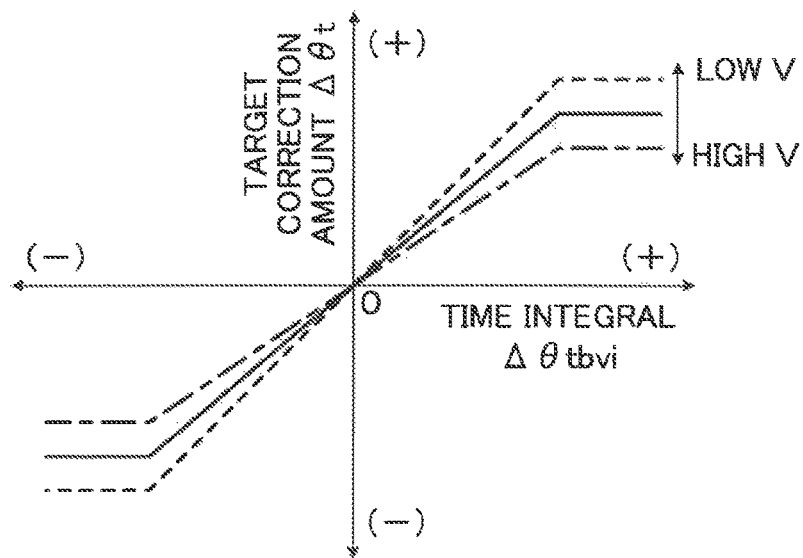
FIG. 15 is a map depicting a relationship between a time integral Δθtbvi of a corrected basic target correction amount Δθtbv and the target correction amount Δθt of the target steering angle θt.

In Step 114, as shown in FIG. 15, the magnitude of the time integral Δθtbvi is guarded so as not to exceed a limit value, to thereby calculate the guarded time integral Δθtbvi as the target correction amount Δθt of the target steering angle θt. The magnitude of the limit value for guarding is variably set depending on the vehicle speed V so that the magnitude becomes smaller as the vehicle speed V becomes higher.

<Driving Support Control>

Figure 6:
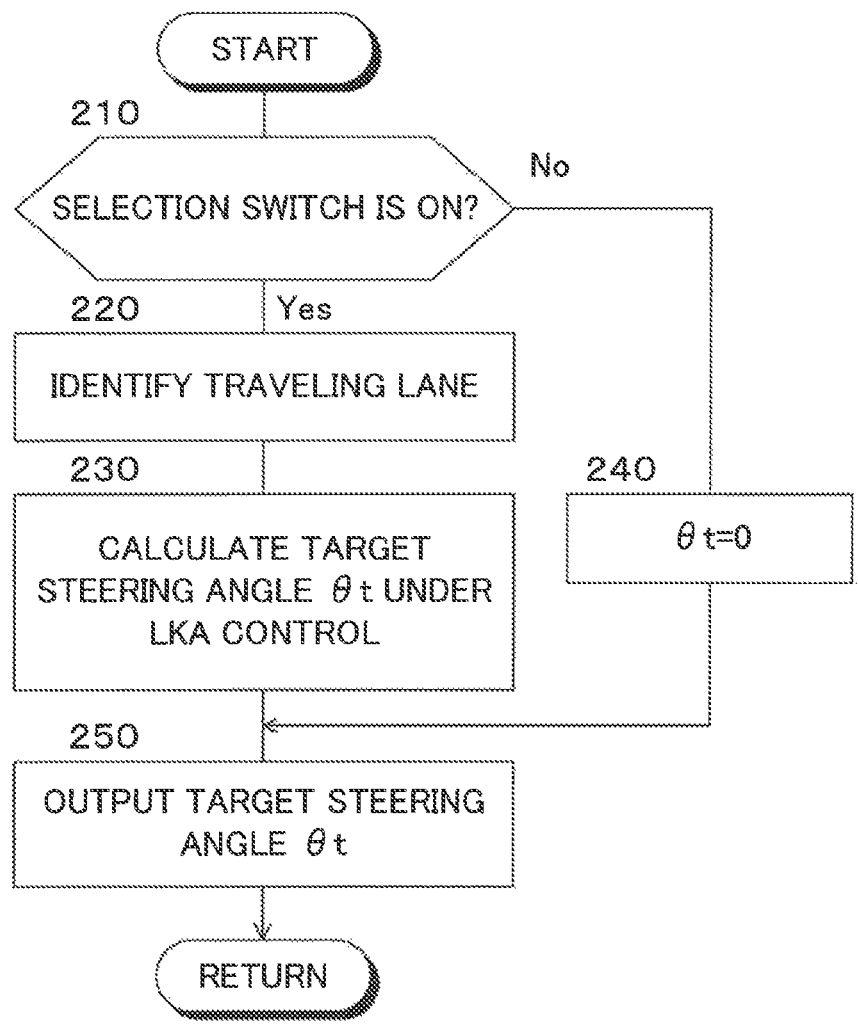
FIG. 6 is a flowchart depicting an exemplary routine for controlling driving support according to the first exemplary embodiment of the present disclosure.

Next, a description is given of an exemplary routine for controlling driving support in the first exemplary embodiment with reference to the flowchart illustrated in FIG. 6.

First, in Step 210, a signal indicating image information on the front field of view of the vehicle that is photographed with the CCD camera 60, and a signal indicating the position of the selection switch 62 are read. Further, it is determined whether the selection switch 62 is on or off, that is, whether LKA control is performed. When a negative determination is made (No at Step 210), the driving support control proceeds to Step 240, whereas when an affirmative determination is made (Yes at Step 210), the driving support control proceeds to Step 220.

In Step 220, a traveling lane that is ahead of the vehicle 18 is identified based on the image information on the front field of view of the vehicle that is photographed with the CCD camera 60 and the like, and a target course under LKA control is set. In Step 230, the target steering angle θt under LKA control, namely, the target steering angle θt for allowing the vehicle 18 to travel along the target course, is calculated. The identification of the traveling lane, the setting of the target course, and the calculation of the target steering angle θt may be executed by any arbitrary technique widely known in the technical field such as, for example, the one described in Japanese Patent No. 5737197.

In Step 240, the target steering angle θt not under LKA control is set to 0. When one of Step 230 and Step 240 is finished, the driving support control proceeds to Step 250.

In Step 250, a signal indicating the target steering angle θt is output from the driving support control device 16 to the EPS control device 14.

<Operation of Driving Support Device 10>

As can be understood from the description given above, when the selection switch 62 is in the operation position (on), the EPS control device 14 and the driving support control device 16 respectively operate as described above. Specifically, by the driving support control device 16 performing the driving support control in accordance with the flowchart illustrated in FIG. 6, the target steering angle θt for the front wheels 20FL and 20FR for allowing the vehicle 12 to travel along the target course is calculated. By the EPS control device 14 controlling the target driving support torque Tdt in accordance with the flowcharts illustrated in FIGS. 2-5, the steering angle of the front wheels 20FL and 20FR is controlled to attain the steering angle corresponding to the target steering angle θt.

In particular, as illustrated and shown in FIGS. 2, 5, and 13, the target driving support torque Tdt differs depending on whether the target driving support torque Tdt is under LKA control, and also differs depending on the value of the indication value Idsi even under LKA control.

<Not Under LKA Control>

When a negative determination is made in Step 20 of FIG. 2, the target driving support torque Tdt and the like are reset to 0 in Step 30, and the target steering assist torque Tat is calculated to be the same value as that of the basic steering assist torque Tab in Step 130. Further, in Step 140, the electric power steering device 12 is controlled under PID feedback control so that the steering torque T attains the target steering assist torque Tat.

<Under LKA Control>

When an affirmative determination is made in Step 20 of FIG. 2, the target driving support torque Tdt is calculated by executing Steps 40-120. That is, in Step 40, the reference steering angle θs and the reference steering torque Ts are calculated in accordance with the flowchart illustrated in FIG. 3, and in Step 70, the indication value Idsi indicating the intention of the driver's steering operation is calculated in accordance with the flowchart illustrated in FIG. 4. In Step 100, the target correction amount Δθt of the target steering angle θt is calculated in accordance with the flowchart illustrated in FIG. 5, and in Step 120, the target driving support torque Tdt is calculated based on the corrected target steering angle θta, which is the sum θt+Δθt of the target steering angle θt under LKA control and the target correction amount Mt.

In Step 130, the target steering assist torque Tat is calculated as the sum of the basic steering assist torque Tab and the target driving support torque Tdt. Further, in Step 140, the electric power steering device 12 is controlled under PID feedback control so that the assist torque Ta attains the target steering assist torque Tat.

In particular, in Steps 42, 44, and 46 of the flowchart illustrated in FIG. 3, the low-pass filtered target steering angle θtf, the low-pass filtered steering angle θf, and the low-pass filtered steering torque Tf are calculated, respectively. Further, in Step 48, the insufficient driving support torque Tds is calculated, and in Steps 54 and 56, the reference steering angle θs is calculated based on the steering angle θ acquired when it is determined in Step 50 that the situation satisfying both of the condition (a) and the condition (b) given above has continued for the time period t0 or more set in advance. Further, in Steps 58 and 60, the reference steering torque Ts is calculated based on the insufficient driving support torque Tds.

As described above, the situation satisfying both of the condition (a) and the condition (b) is the time when the driver has no objection to steering by the driving support. Thus, the corrected steering angle (θ−θs) is a steering angle that is detected relative to a steering angle acquired when the driver has no objection to steering by the driving support, and the difference (T−Ts) between the steering torque T and the reference steering torque Ts is a steering torque that is detected relative to a steering torque acquired when the driver has no objection to steering by the driving support.

Figure 16:
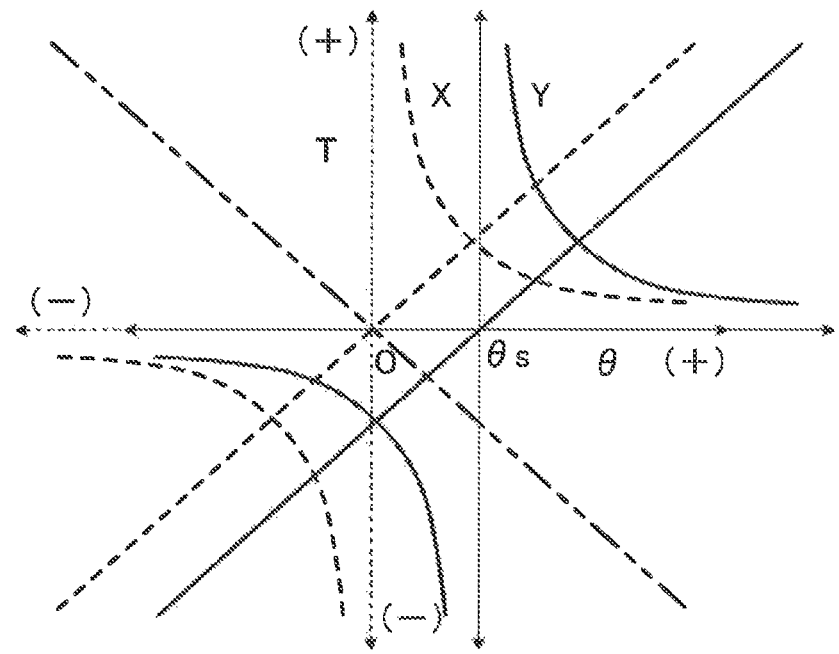
FIG. 16 is a map for determining an intention of the driver's steering operation based on a relationship between a steering angle θ and the steering torque T under or not under lane keeping assist (LKA) control according to the first exemplary embodiment of the present disclosure.

FIG. 16 is a map for determining the intention of the driver's steering operation based on a relationship between the steering angle θ and the steering torque T when LKA control is not performed (not under LKA control) or when LKA control is performed (under LKA control).

Not under LKA control, the steering angle θ and the steering torque T change along the broken lines in FIG. 16 when the driver steers the vehicle. A region on an opposite side of the origin with respect to broken curves X in the first quadrant and the third quadrant is an active steering region, and as the steering angle θ and the steering torque T move further away from the origin, the intention of the driver to actively steer the vehicle becomes stronger. In contrast, a region on a side of the origin with respect to the curves X is a passive steering region, and as the steering angle θ and the steering torque T move further away from the origin, the driver passively steers the vehicle to a higher degree. Thus, it is possible to determine the intention of the driver's steering operation by identifying which region on which side with respect to the curves X the steering angle θ and the steering torque T are in.

On the other hand, under LKA control and when there is no insufficient driving support torque Tds (the reference steering torque Ts is 0), the steering angle θ and the steering torque T change along the solid lines in FIG. 16 when the driver steers the vehicle. Thus, curves for determining the intention of the driver's steering operation need to be set to curves Y corresponding to the curves X in a coordinate system where its origin has coordinates having the steering angle θ equal to the reference steering angle θs and the steering torque T equal to 0. However, in the apparatus described in International Patent WO2014/087546A1, the intention of the driver's steering operation is determined based on the curves X because consideration is not given to whether LKA control is performed, and thus the intention of the driver's steering operation cannot be appropriately determined.

When there is a disturbance from a road surface or the front wheels 20FL and 20FR are steered under LKA control, the signs of the steering angle θ and the steering torque T are opposite, and thus the steering angle θ and the steering torque T change along the long dashed double-short dashed line in FIG. 16. This is also the case in FIG. 17-FIG. 21, FIG. 26, and FIG. 27 described later.

In the first exemplary embodiment, the difference θ−θs between the steering angle θ and the reference steering angle θs, and its time derivative are used as the steering angle and its time derivative of the first product Pr1 the second product Pr2, and the third product Pr3 in Steps 72-78 of the flowchart illustrated in FIG. 4. Thus, under LKA control and when there is no insufficient driving support torque Tds, the intention of the driver's steering operation is determined based on the curves Y, and hence it is possible to calculate the indication value Idsi appropriately indicating the intention of the driver's steering operation irrespective of the target steering angle θt under LKA control.

Further, in the first exemplary embodiment, the insufficient driving support torque Tds is calculated in Step 48 of the flowchart illustrated in FIG. 3, and the reference steering torque Ts is calculated based on the insufficient driving support torque Tds in Steps 58 and 60. Further, the difference T-Ts between the steering torque T and the reference steering torque Ts, and its time derivative are used as the steering torque and its time derivative of the first product Pr1 the second product Pr2, and the third product Pr3 in Steps 72-78 of the flowchart illustrated in FIG. 4.

Figure 17:
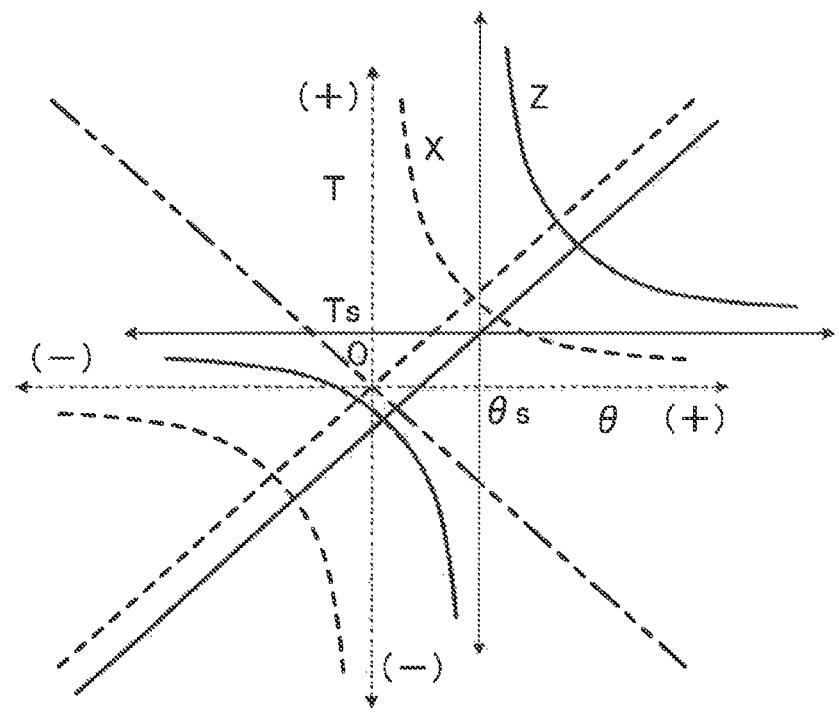
FIG. 17 is a map for determining the intention of the driver's steering operation based on the relationship between the steering angle θ and the steering torque T under the LKA control and when there is an insufficient driving support torque Tds according to the first exemplary embodiment of the present disclosure.
Figure 18:
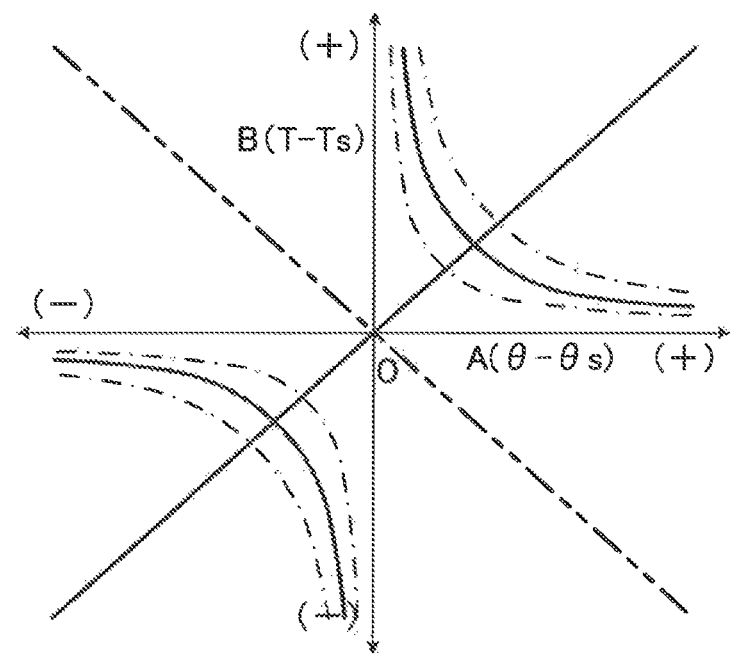
FIG. 18 is a map for determining the intention of the driver's steering operation based on a product A(θ−θs) and a product B(T−Ts) according to the first exemplary embodiment of the present disclosure.
Figure 19:
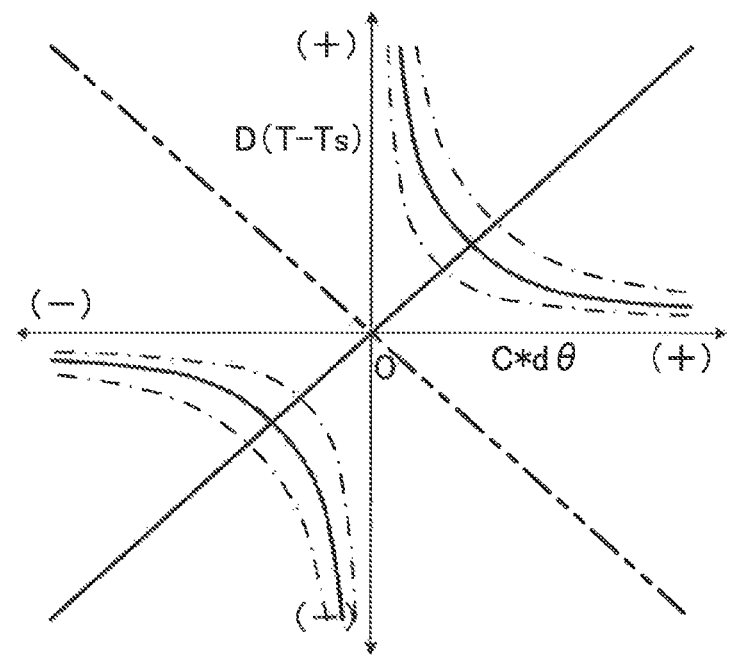
FIG. 19 is a map for determining the intention of the driver's steering operation based on a product C*dθ and a product D(T−Ts) according to the first exemplary embodiment of the present disclosure.
Figure 20:
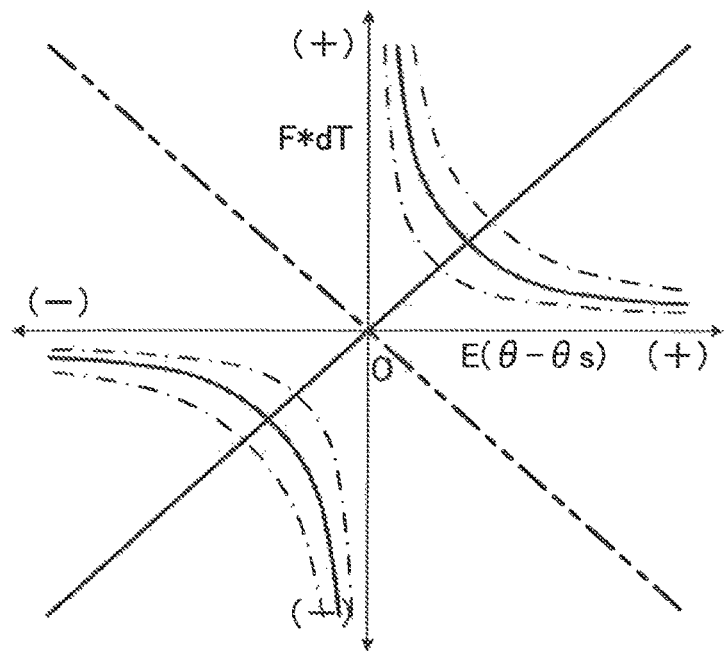
FIG. 20 is a map for determining the intention of the driver's steering operation based on a product E(θ−θs) and a product F*dT according to the first exemplary embodiment of the present disclosure.

Thus, as shown in FIG. 17, under LKA control and when there is the insufficient driving support torque Tds, the intention of the driver's steering operation is determined based on curves Z corresponding to the curves X in a coordinate system whose origin is coordinates having the steering angle θ equal to the reference steering angle θs and the steering torque T equal to the reference steering torque Ts. Therefore, it is possible to calculate the indication value Idsi appropriately indicating the intention of the driver's steering operation irrespective of the target steering angle θt and the insufficient driving support torque Tds under LKA control.

The first product Pr1 is the product A(θ−θs)*B(T−Ts). Thus, in a map shown in FIG. 18, with the product A(θ−θs) as its horizontal axis and the product B(T−Ts) as its vertical axis, the first product Pr1 indicates the intention of the driver's steering operation depending on the existing position of the first product Pr1. Similarly, the second product Pr2 is the product C*dθ*D(T−Ts). Thus, in a map shown in FIG. 19, with the product C*dθ as its horizontal axis and the product D(T−Ts) as its vertical axis, the second product Pr2 indicates the intention of the driver as to steering depending on the existing position of the second product Pr2. Further, the third product Pr3 is the product E(θ−θs)*F*dT. Thus, in a map shown in FIG. 20, with the product E(θ−θs) as its horizontal axis and the product F*dT as its vertical axis, the third product Pr3 indicates the intention of the driver's steering operation depending on the existing position of the third product Pr3.

Further, in the first exemplary embodiment, the difference θ−θs between the steering angle θ and the reference steering angle θs, and its time derivative are used as the steering angle and its time derivative of the first product Pr1 the second product Pr2, and the third product Pr3. Thus, even when a steady-state error is contained in the steering angle θ and the reference steering angle θs due to, for example, a neutral position deviation of the steering angle sensor 50, the error is cancelled by the calculation of the difference θ−θs.

As a result, it is possible to calculate the indication value Idsi appropriately indicating the intention of the driver's steering operation without being influenced by the steady-state error.

Further, in the first exemplary embodiment, the target steering angle θt is calculated, which corresponds to the target steered angles of the front wheels 20FL and 20FR for allowing the vehicle 18 to travel along the target course with the driving support control device 16. Then, in Steps 102-114 of the flowchart illustrated in FIG. 5, the target correction amount Δθt for reflecting the intention of the driver's steering operation in the target steering angle θt is calculated based on the indication value Idsi. Further, in Steps 120 and 130, the target driving support torque Tdt for causing the steering angle θ to attain the corrected target steering angle θta(=θt+Δθt), namely, the target driving support torque reflecting the intention of the driver's steering operation is calculated without changing the target course targeted by the driving support.

Thus, in the first exemplary embodiment, it is possible to correct the target steering angle θt so that the target driving support torque Tdt is appropriately corrected in accordance with the intention of the driver's steering operation without changing the target course under LKA control. Therefore, it is possible to satisfy the intention of the driver to cause the vehicle 18 to travel along a path that is shifted leftward or rightward with respect to the target course without changing the target course under LKA control.

In particular, when the indication value Idsi is a positive value, in Step 106, the target correction amount Δθt for reflecting the intention of the driver's steering operation is calculated to be larger as the indication value Idsi becomes larger. Therefore, it is possible to cause the target correction amount Δθt to become larger as the intention of the driver to actively steer the vehicle becomes stronger, to thereby effectively satisfy the intention of the driver to cause the vehicle 18 to travel along a path that is shifted leftward or rightward with respect to the target course.

On the other hand, when the indication value Idsi is a negative value, in Step 106, the target correction amount Δθt is calculated to be a negative value whose magnitude does not become larger as the magnitude of the indication value Idsi becomes larger. Therefore, when the driver causes the vehicle 18 to travel along a path that is shifted leftward or rightward with respect to the target course and then to travel along the target course, it is possible to effectively return the vehicle 18 to a state of traveling along the target course. As indicated by the broken lines in FIG. 13, when the indication value Idsi is a negative value, the target correction amount Δθt may be corrected to be calculated to be 0. In this modified example, when the indication value Idsi is a negative value, the vehicle 18 travels along the target course.

Figure 30:
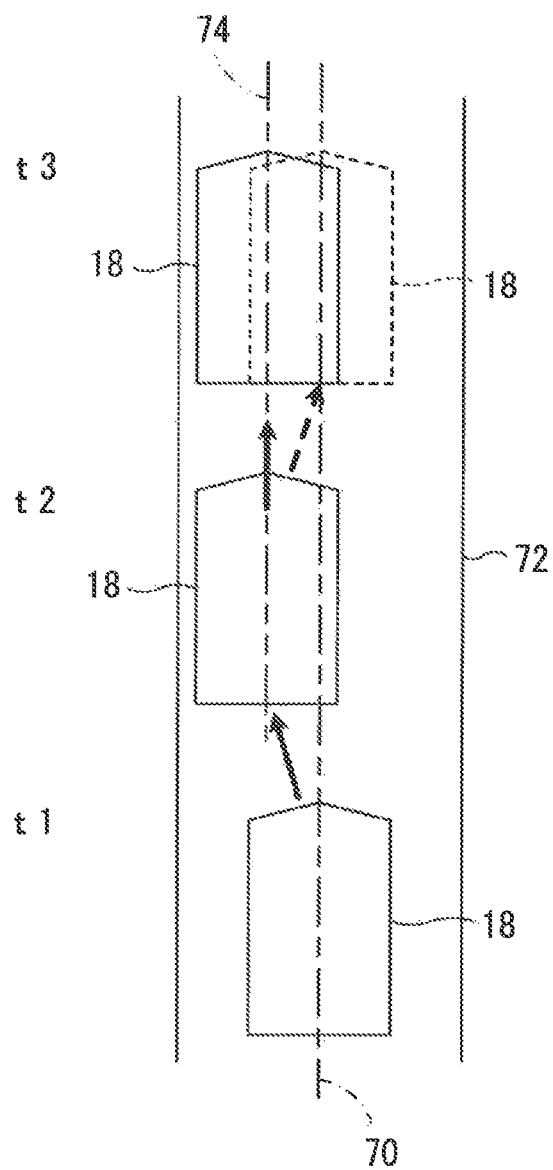
FIG. 30 is an explanatory diagram for illustrating an example of a positional change in a lateral direction of the vehicle with respect to a lane when a driver performs steering under a situation in which the vehicle is controlled to travel along a target course under LKA control.

For example, FIG. 30 is an illustration of an example of a positional change in a lateral direction of the vehicle 18 with respect to a lane 72 when the driver performs steering under a situation in which the vehicle 18 is controlled to travel along a target course 70 under LKA control.

At a time t1, the driver starts steering the vehicle 18 so that the vehicle 18 travels leftward with respect to the lane 72. At a time t2, the vehicle 18 has traveled leftward with respect to the lane 72 to a position intended by the driver, and the driver tries to cause the vehicle 18 to travel along an intended course 74 steadily. In the case of the driving support device described in Japanese Patent Application Laid-open No. 2007-326447, when the steering operation input value is less than a predetermined reference value, the target course 70 is not corrected. Thus, as indicated by the broken line in FIG. 30, the vehicle 18 is caused to travel rightward with respect to the lane 72 and is controlled so that the vehicle 18 travels along the target course 70 after a time t3. Therefore, the intention of the driver to cause the vehicle 18 to travel along the intended course 74 is not satisfied.

In contrast, in the first exemplary embodiment, the indication value Idsi is calculated based on the difference $\theta-\theta s$ between the steering angle $\theta$ and the reference steering angle $\theta s$, its time derivative, and the like with the steering angle $\theta$ acquired when the vehicle 18 travels along the target course 70 being set as the reference steering angle $\theta s$. Then, the target steering angle $\theta t$ is corrected based on the indication value Idsi so that the target driving support torque Tdt is appropriately corrected in accordance with the intention of the driver's steering operation. Thus, the vehicle 18 does not travel rightward with respect to the lane 72, and maintains the state of traveling along the intended course 74. Therefore, the intention of the driver to cause the vehicle 18 to travel along the intended course 74 is satisfied.

Further, a case is assumed for comparison, in which when the magnitude of the difference $\theta-\theta t$ between the steering angles is estimated to be less than the reference value $\theta 0$ and the magnitude of the difference T-Tds between the steering torque T and the insufficient driving support torque Tds is estimated to be less than the reference value T0, the steering angle $\theta$ at that time is set as the reference steering angle $\theta s$. In the first exemplary embodiment, when the magnitude of the difference $\theta-\theta t$ between the steering angles is estimated to be less than the reference value $\theta 0$ and the magnitude of the difference T-Tds between the steering torque T and the insufficient driving support torque Tds is estimated to be less than the reference value T0 for a predetermined time period or more continuously, the steering angle $\theta$ at that time is set as the reference steering angle $\theta s$. Therefore, compared to the case for comparison, it is possible to more correctly determine the situation in which the driver has no objection to steering by the driving support, and more correctly set the reference steering angle $\theta s$ without being influenced by the steering torque supplemented by the driver to allow the vehicle to travel along the target course.

Further, in Step 54 of the flowchart illustrated in FIG. 3, the basic reference steering angle $\theta$ sb is set to the current steering angle $\theta$, and in Step 56, the basic reference steering angle $\theta$ sb is low-pass filtered to calculate the reference steering angle $\theta s$. Thus, through low-pass filtering in Step 56, the magnitude of the time rate of change $d\theta s$ of the reference steering angle $\theta$ s can be limited to be, for example, the limit rate of change $d\theta s 0$ or less set in advance, to thereby prevent the drastic change of the reference steering angle $\theta s$. Therefore, it is possible to prevent the drastic changes of the indication value Idsi, the target correction amount net, and the target driving support torque Tdt, and stably execute control of the vehicle 18 so that the vehicle 18 travels along a path that is shifted leftward or rightward with respect to the target course.

Further, in the first exemplary embodiment, the product G1*Pr1 of the first product Pr1 and the weight coefficient G1, the product G2*Pr2 of the second product Pr2 and the weight coefficient G2, and the product G3*Pr3 of the third product Pr3 and the weight coefficient G3 are added to calculate the sum (G1*Pr1+G2*Pr2+G3*Pr3) as the indication value Idsi. Therefore, it is possible to more appropriately reflect the intention of the driver's steering operation in the target driving support torque Tdt compared to the case of the indication value Idsi being a sum of at least two of the above-mentioned three products. Further, it is possible to reflect the intention of the driver's steering operation in the target driving support torque Tdt by weighting each of the above-mentioned three products through setting of the weight coefficients G1, G2, and G3.

Further, in the first exemplary embodiment, the first product PO is the product A($\theta-\theta s$)*B(T-Ts), the second product Pr2 is the product C*d$\theta$*D(T-Ts), and the third product Pr3 is the product E($\theta-\theta s$)*F*dT. Through setting of the weight coefficients A-F, it is possible to weight values relating to the steering angle, e.g., $\theta-\theta s$, in the first-third products Pr1-Pr3, and values relating to the steering torque, e.g., T-Ts, to thereby reflect the intention of the driver's steering operation in the target driving support torque Tdt.

Second Exemplary Embodiment

Figure 7:
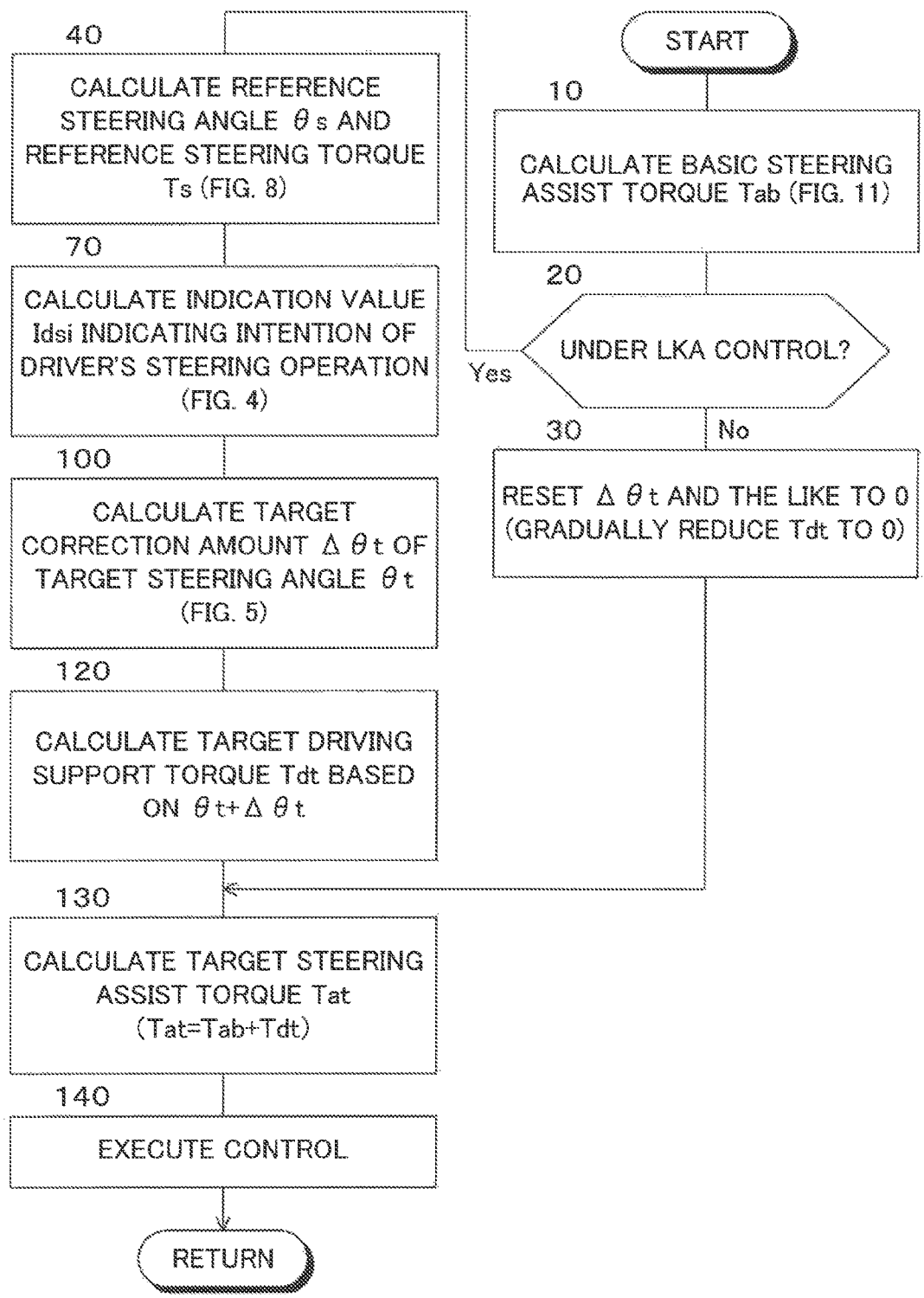
FIG. 7 is a flowchart depicting an exemplary routine for controlling a steering assist torque according to a second exemplary embodiment of the present disclosure.

FIG. 7 is a flowchart for illustrating an exemplary routine for controlling a steering assist torque in an exemplary embodiment of the present disclosure. In FIG. 7, the same step as the step illustrated in FIG. 2 is denoted by the same step number as that assigned in FIG. 2. The same applies to a third exemplary embodiment and first-third modified examples of the present disclosure described later.

Figure 8:
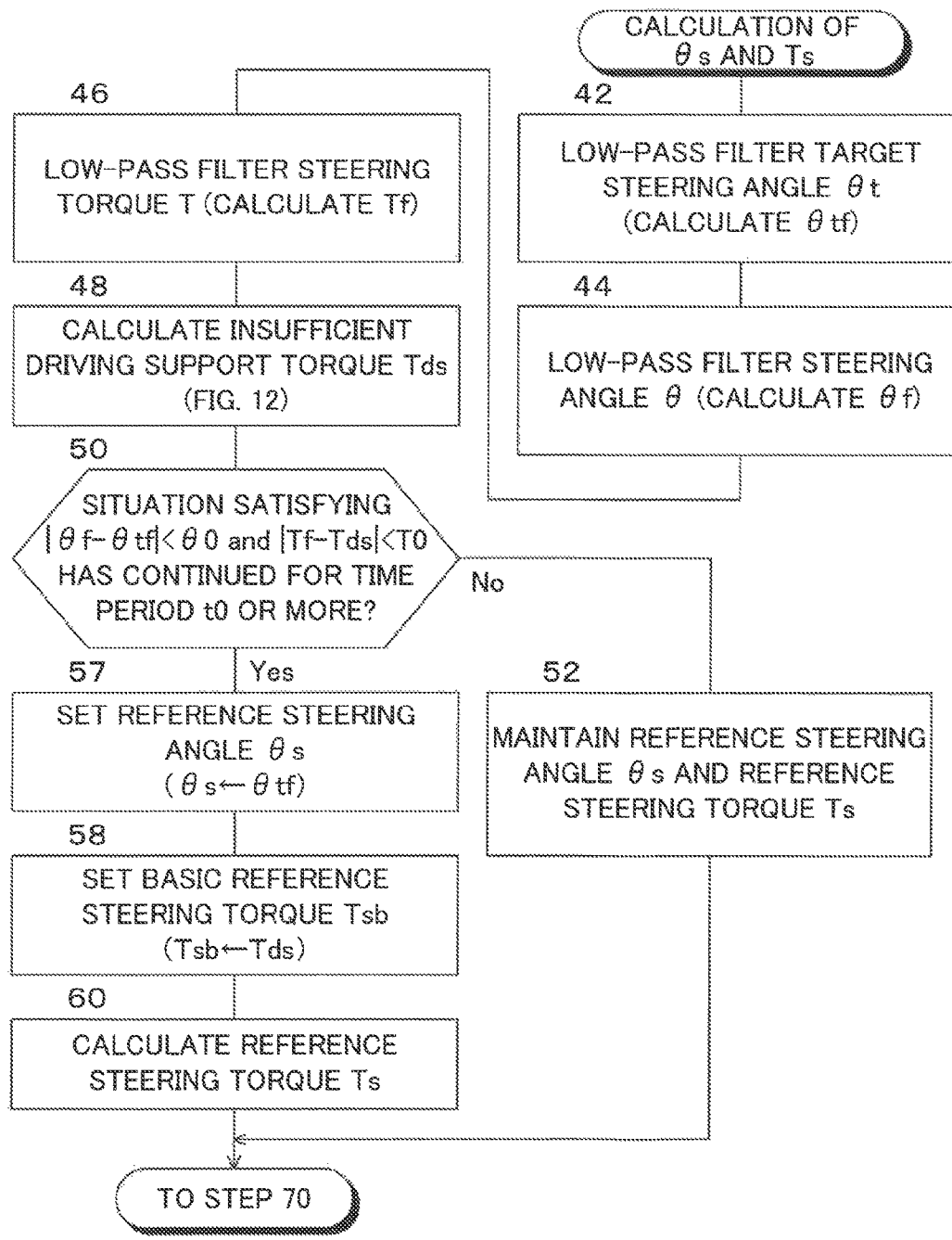
FIG. 8 is a flowchart depicting an exemplary routine for calculating the reference steering angle θs and the reference steering torque Ts according to the second exemplary embodiment of the present disclosure.

As can be understood from a comparison between FIG. 7 and FIG. 2, in the second exemplary embodiment, the reference steering angle $\theta$ s and the reference steering torque Ts are calculated in Step 40 in accordance with the flowchart illustrated in FIG. 8. Steps other than Step 40 of FIG. 7 are executed similarly to the case of the first exemplary embodiment.

As illustrated in FIG. 8, Steps 42-52 and Steps 58 and 60 are executed similarly to the case of the first exemplary embodiment. In Step 50, when a negative determination is made (No at Step 50), the control proceeds to Step 52, whereas when an affirmative determination is made (Yes at Step 50), that is, when the situation satisfying both of the condition (a) and the condition (b) given above has continued for the time period t0 or more set in advance, the control proceeds to Step 57.

In Step 57, the reference steering angle $\theta s$ is set to the low-pass filtered target steering angle $\theta tf$ calculated in Step 42, and the control proceeds to Step 58.

When an affirmative determination is made in Step 50 (Yes at Step 50), the low-pass filtered steering angle $\theta f$ is a value close to the low-pass filtered target steering angle $\theta tf$, and thus the target steering angle $\theta tf$ can be used as an alternative value for the low-pass filtered steering angle $\theta f$ to set the reference steering angle $\theta s$ to the target steering angle $\theta tf$.

In the second exemplary embodiment, Steps 54 and 56 of the first exemplary embodiment are replaced with Step 57, and the reference steering angle $\theta s$ is set to the low-pass filtered target steering angle $\theta tf$. Other steps are executed similarly to the case of the first exemplary embodiment except those points. Thus, the same actions and effects as those of the first exemplary embodiment can be acquired except that the reference steering angle $\theta s$ is not set based on the low-pass filtered steering angle $\theta f$ but is set to the low-pass filtered target steering angle $\theta tf$.

Figure 21:
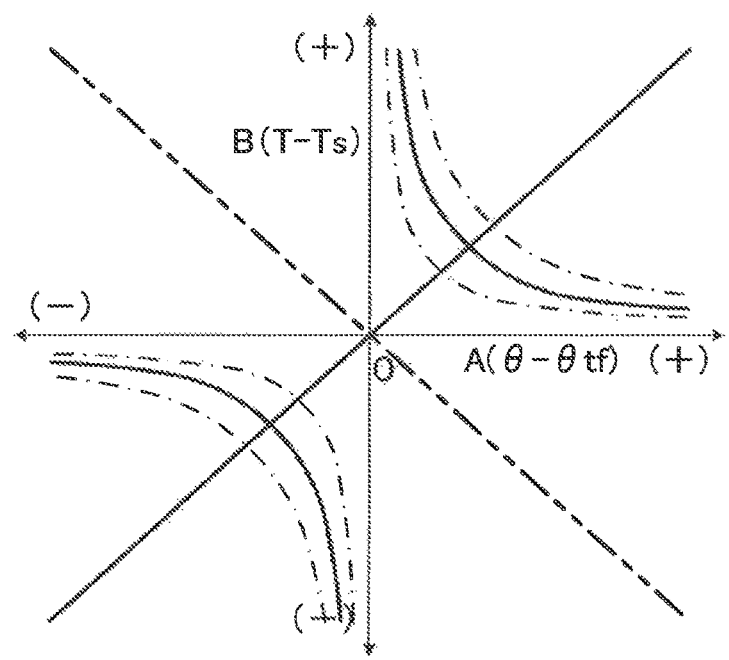
FIG. 21 is a map for determining the intention of the driver's steering operation based on a product A(θ−θtf) and a product B(T−Ts) according to the second exemplary embodiment of the present disclosure.

In the second exemplary embodiment, the map for determining the intention of the driver's steering operation is a map shown in FIG. 21 with the product A($\theta-\theta tf$) as its horizontal axis and the product B(T-Ts) as its vertical axis.

The second exemplary embodiment is an exemplary embodiment that has modified the first exemplary embodiment by setting the reference steering angle $\theta s$ in the first exemplary embodiment to the low-pass filtered target steering angle $\theta tf$. The third exemplary embodiment and the first-third modified examples described later may be modified similarly to the first exemplary embodiment by setting the reference steering angle θs in those exemplary embodiments and modified examples to the low-pass filtered target steering angle θtf. In the case of those modified examples, the actions and effects as those of the corresponding exemplary embodiments and modified examples can be acquired.

Third Exemplary Embodiment

Figure 9:
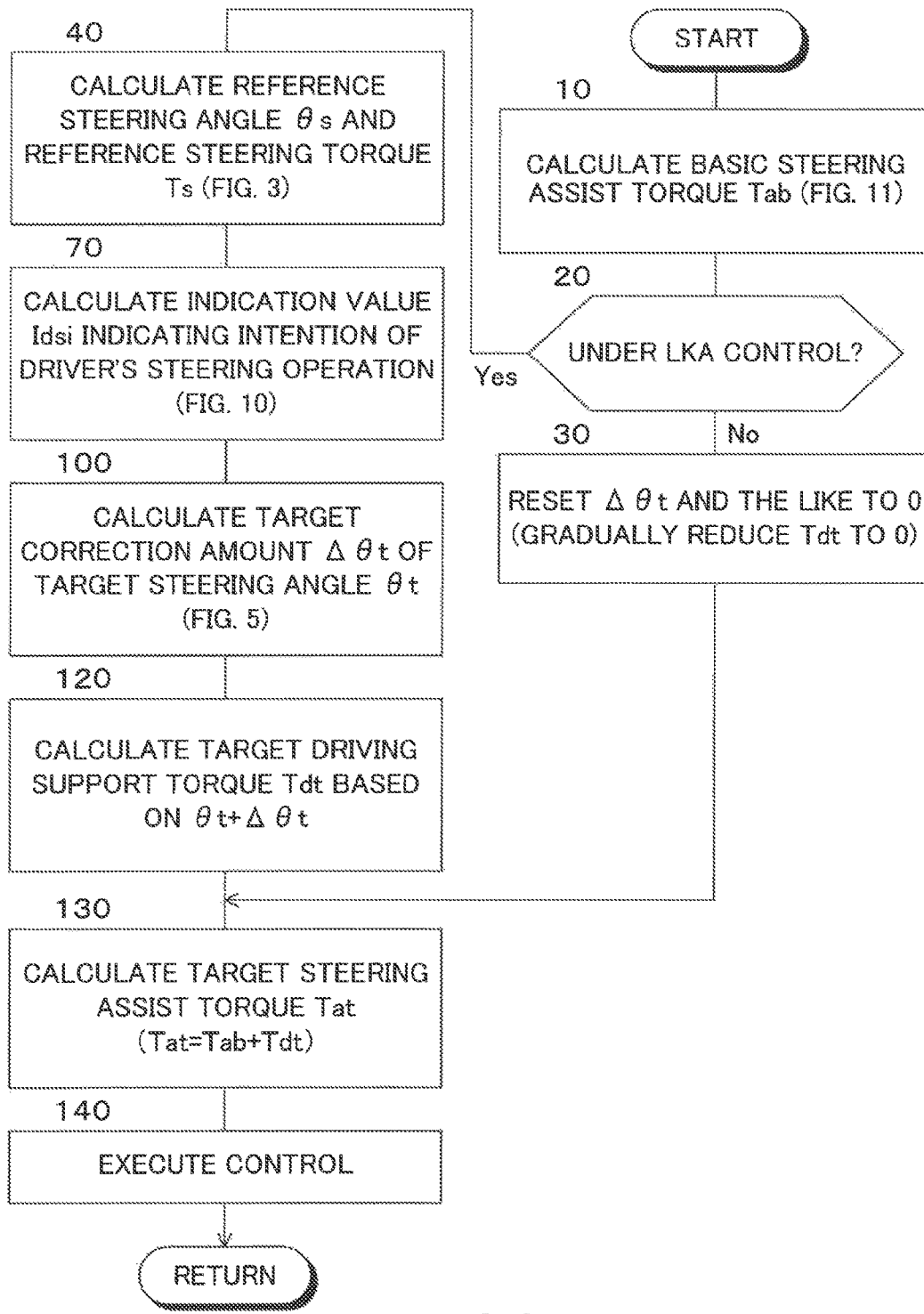
FIG. 9 is a flowchart depicting an exemplary routine for controlling a steering assist torque according to a third exemplary embodiment of the present disclosure.

FIG. 9 is a flowchart for illustrating an exemplary routine of controlling a steering assist torque in the third exemplary embodiment.

In the first exemplary embodiment described above, when the weight coefficients A and B to be used for calculating the first product Pr1 in Step 72 of FIG. 4 are set to 1, the first product Pr1 is calculated in accordance with Expression (1).

$$Pr1=(\theta-\theta s)(T-Tds) \quad (1)$$

The intention of the driver for transitional steering is considered to be represented by a time derivative dPr1 of the first product Pr1. Thus, Expression (1) is time-differentiated to acquire Expression (2).

$$dPr1=d\theta*(T-Tds)+(\theta-\theta s)*dT \quad (2)$$

Further, Expression (2) is time-integrated to acquire Expression (3). It is understood that the sum of the time integral $d\theta*(T-Tds)$ and the time integral $(\theta-\theta s)*dT$ can be acquired as the first product Pr1 from Expression (3).

$$\begin{aligned} Pr1 &= \int dPr1 dt \\ &= \int \{d\theta^*(T-Tds) + (\theta-\theta s)^* dT\} dt \\ &= \int \{d\theta^*(T-Tds)\} dt + \int \{(\theta-\theta s)^* dT\} dt \end{aligned} \quad (3)$$

The product $d\theta*(T-Tds)$ of Expression (3) is the second product Pr2 acquired when the weight coefficients C and D are 1, and the product $(\theta-\theta s)*dT$ is the third product Pr3 acquired when the weight coefficients E and F are 1. Thus, the first term in Expression (3) is an integral of the second product Pr2 acquired when the weight coefficients C and D are 1, and the second term in Expression (3) is an integral of the third product acquired when the weight coefficients E and F are 1.

The first term in Expression (3) indicates the intention for steering whose motion is manifested like rotation of the steering wheel 22 within the intention of the driver for steady-state steering. In contrast, the second term in Expression (3) indicates the intention for steering whose motion is not manifested unlike rotation of the steering wheel 22 within the intention of the driver for steady-state steering. When the weight coefficients in the first and second terms of Expression (3) are Ai and Bi (both are positive constants), Expression (3) can be transformed into Expression (4). With Expression (4), the product $(d\theta*(T-Tds))$ and the product $((\theta-\theta s)*dT)$ are each integrated and weighted, and then added to calculate a weighted sum as an alternative value for the first product Pr1 $(A(\theta-\theta s)*B(T-Tds))$. Further, at least one of the weight coefficients Ai and Bi may be 1.

$$Pr1i=Ai*\int\{d\theta*(T-Tds)\}dt+Bi\int\{(\theta-\theta s)*dT\}dt \quad (4)$$

Figure 10:
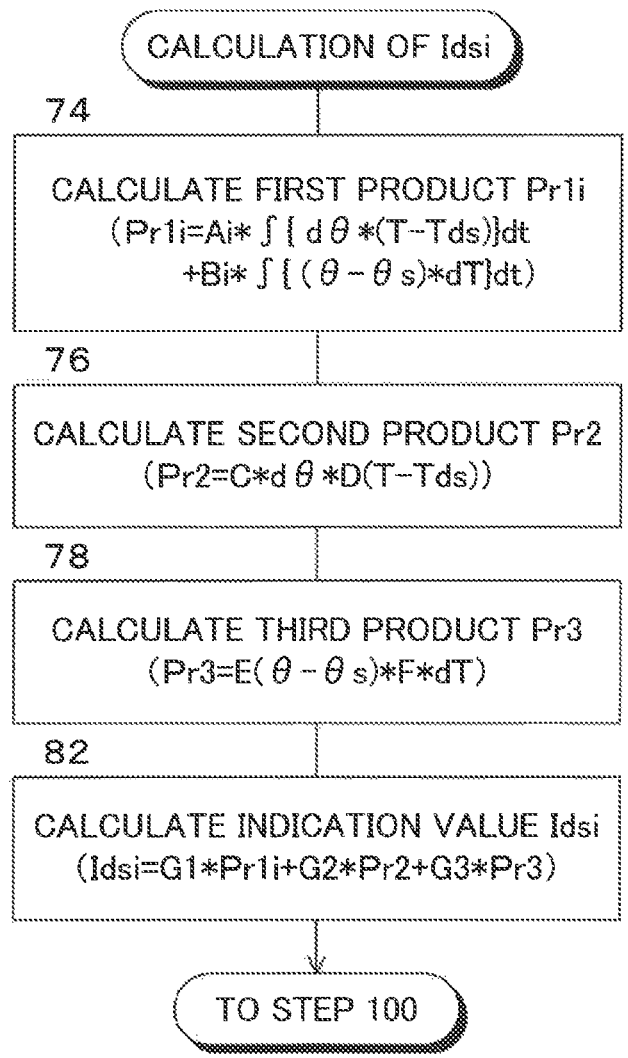
FIG. 10 is a flowchart depicting an exemplary routine for calculating the indication value Idsi according to the third exemplary embodiment of the present disclosure.

As can be understood from a comparison between FIG. 9 and FIG. 2, in the third exemplary embodiment, the indication value Idsi is calculated in Step 70 in accordance with the flowchart illustrated in FIG. 10. Steps other than Step 70 of FIG. 9 are executed similarly to the case of the first exemplary embodiment.

As illustrated in FIG. 10, Steps 76-82 are executed similarly to the case of the first exemplary embodiment, and Step 74 is executed in place of Step 72. In Step 74, the first product Pr1 is calculated in accordance with Expression (4) for a time period from a time at which an affirmative determination is made in Step 50 of the flowchart illustrated in FIG. 3 to the current time.

Thus, in the third exemplary embodiment, it is possible to weight the intention for steady-state steering whose motion is manifested and the intention for steady-state steering whose motion is not manifested, and appropriately reflect the intention of the driver's steering operation in the target driving support torque. Further, in the third exemplary embodiment, except that Step 74 is executed in place of Step 72 of the first exemplary embodiment, the other steps are executed similarly to the case of the first exemplary embodiment. Thus, the same actions and effects as those of the first exemplary embodiment are acquired for other points. The map for determining the intention of the driver's steering operation in the third exemplary embodiment is the map shown in FIG. 18, which is the same as that of the first exemplary embodiment.

First Modified Example

Figure 22:
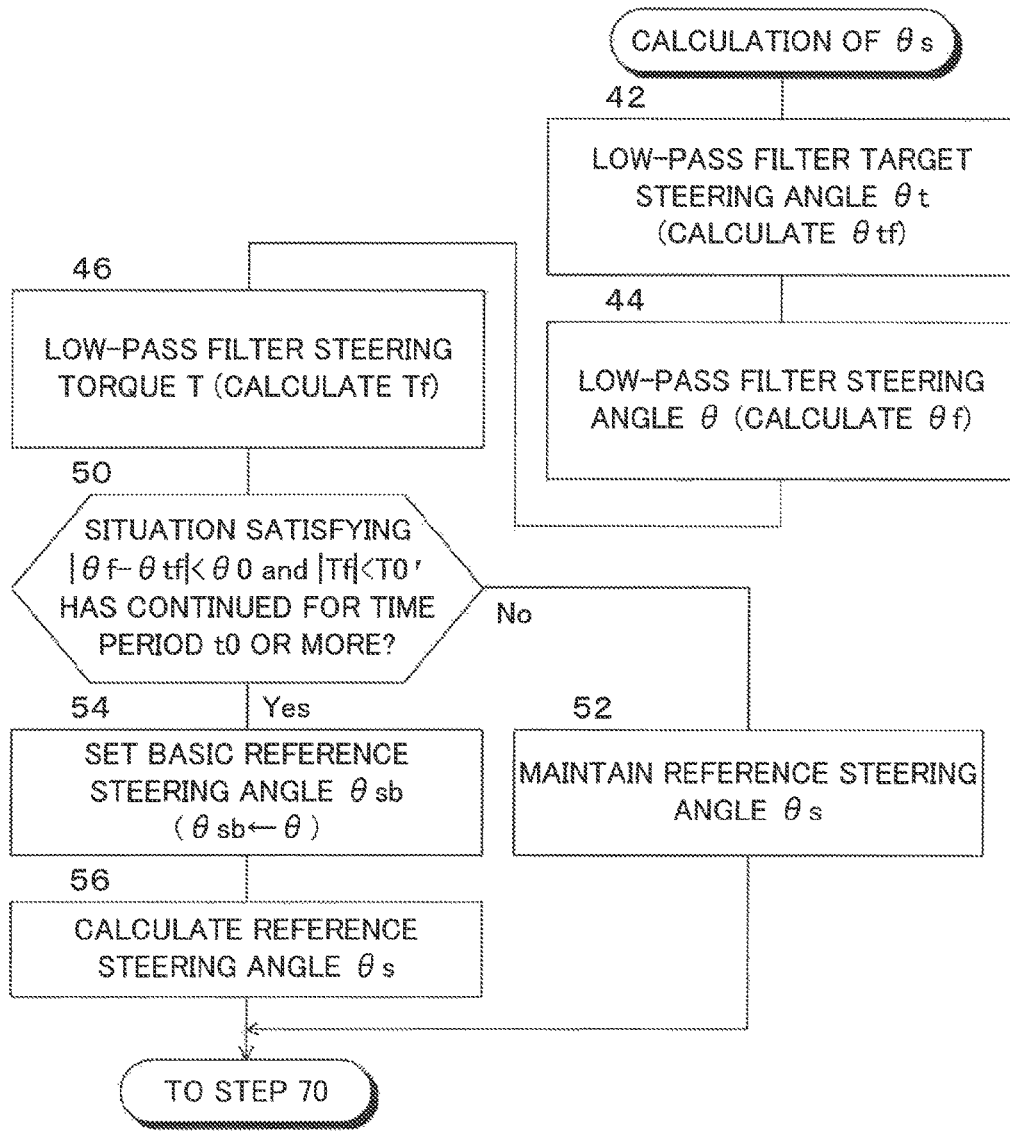
FIG. 22 is a flowchart depicting an exemplary routine for calculating the reference steering angle θs according to a first modified example of the present disclosure.
Figure 23:
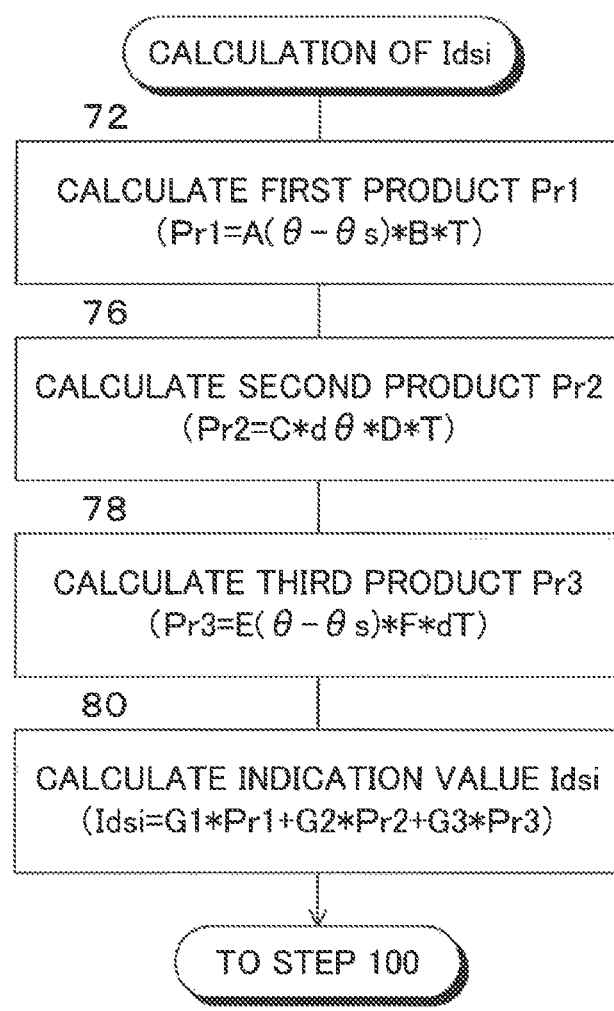
FIG. 23 is a flowchart depicting an exemplary routine for calculating the indication value Idsi according to the first modified example.

FIGS. 22 23 are flowcharts for illustrating exemplary routines of calculating the reference steering angle θs and the indication value Idsi in a first modified example of the present disclosure, which is constructed as a modified example of the first exemplary embodiment, respectively.

Step 48 of the flowchart illustrated in FIG. 3 is not executed in the first modified example, and thus the insufficient driving support torque Tds is not calculated. Thus, as illustrated in FIG. 22, Steps 48, 58, and 60 of the flowchart illustrated in FIG. 3 are not executed.

Further, in Step 50, it is determined whether a situation satisfying both of the condition (a) and a condition (b') given below has continued for the time period t0 (positive constant) or more set in advance. When an affirmative determination is made (Yes at Step 50), the control proceeds to Step 54, whereas when a negative determination is made (No at Step 50), the reference steering angle θs is maintained to a current value without update thereof in Step 52. The conditions being as follows:

(a) The absolute value of the difference between the low-pass filtered steering angle θf and the low-pass filtered target steering angle θtf is less than the reference value θ0 (positive constant close to 0).

(b') The absolute value of the low-pass filtered steering torque Tf is less than the reference value T0' (positive constant close to 0).

Further, as illustrated in FIG. 23, Steps 78 and 80 are executed similarly to the case of the first exemplary embodiment, but the calculation of the first product Pr1 in Step 72 and the calculation of the second product Pr2 in Step 76 are different from those of the exemplary first embodiment.

In Step 72, the product $A(\theta-\theta s)$ of the difference $(\theta-\theta s)$ between the steering angle θ and the reference steering angle θs, and the weight coefficient A (positive constant) is multiplied by a product $B*T$ of the steering torque T and the weight coefficient B (positive constant) to calculate a product $A(\theta-\theta s)*B*T$ as the first product Pr1. The first product Pr1 also does not contain the time derivative of the steering angle θ and the time derivative of the steering torque T, and thus is an indication value indicating the intention of the driver for steady-state steering. Further, at least one of the weight coefficients A and B may be 1.

In Step 76, the time derivative dθ of the steering angle θ is calculated, and the product C*dθ of the time derivative dθ and the weight coefficient C (positive constant) is multiplied by a product D*T of the steering torque T and the weight coefficient D (positive constant) to calculate a product C*dθ*D*T as the second product Pr2. The second product Pr2 contains the time derivative dθ of the steering angle θ, and thus is an indication value indicating the intention of the driver for transitional steering. Further, at least one of the weight coefficients C and D may be 1.

In the first modified example, the insufficient driving support torque Tds is not calculated, and the insufficient driving support torque Tds is not considered in the calculation of the indication value Idsi. Thus, when there is actually an insufficient driving support torque, the accuracy of the indication value Idsi indicating the intention of the driver's steering operation is low compared to the case of the first exemplary embodiment. However, the same actions and effects as those of the first exemplary embodiment described above can be acquired except that point.

Also in the first modified example, the difference θ−θs between the steering angle θ and the reference steering angle θs and its derivative are used to calculate the first-third products. Thus, in the first modified example, it is possible to determine the intention of the driver's steering operation under LKA control more accurately compared to the case of the apparatus described in International Patent WO2014/087546A1 described above, which does not take the reference steering angle θs into consideration. This also applies to the second and third modified examples described below.

Second Modified Example

Figure 24:
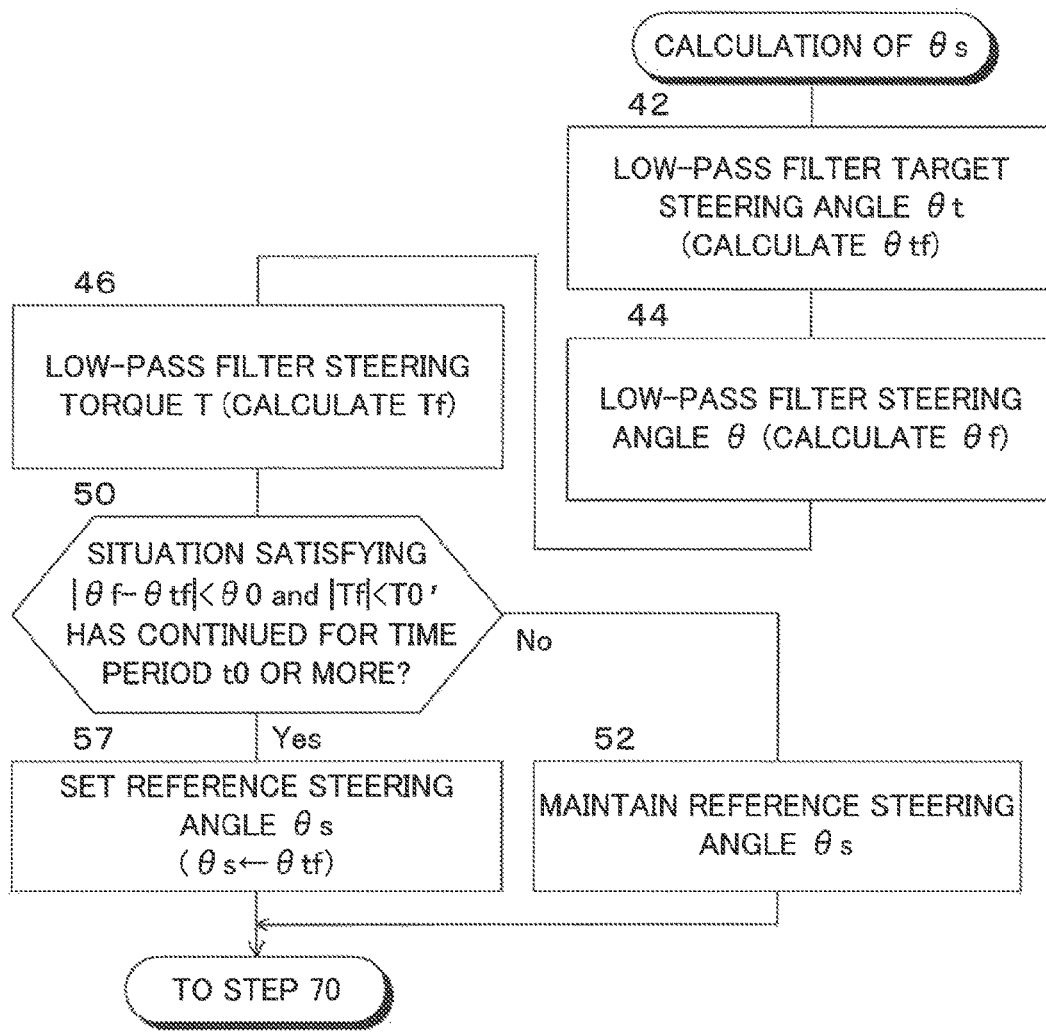
FIG. 24 is a flowchart depicting an exemplary routine for calculating the reference steering angle θs according to a second modified example of the present disclosure.

FIG. 24 is a flowchart for illustrating an exemplary routine for calculating the reference steering angle θs in the second modified example, which is constructed as a modified example of the second exemplary embodiment.

Step 48 is not executed in the second modified example, and thus the insufficient driving support torque Tds is not calculated. As can be understood from a comparison between FIG. 24 and FIG. 22, the routine for calculating the reference steering angle θs is executed similarly to that of the first modified example except that Step 57 is executed in place of Steps 54 and 56 in the first exemplary embodiment similarly to the case of the second exemplary embodiment.

In the second modified example, similarly to the case of the first modified example, the insufficient driving support torque Tds is not calculated, and the insufficient driving support torque Tds is not considered in the calculation of the indication value Idsi. Thus, when there is actually the insufficient driving support torque, the accuracy of the indication value Idsi indicating the intention of the driver's steering operation is low compared to the case of the first exemplary embodiment. However, the same actions and effects as those of the first exemplary embodiment described above can be acquired except that point.

Third Modified Example

Figure 25:
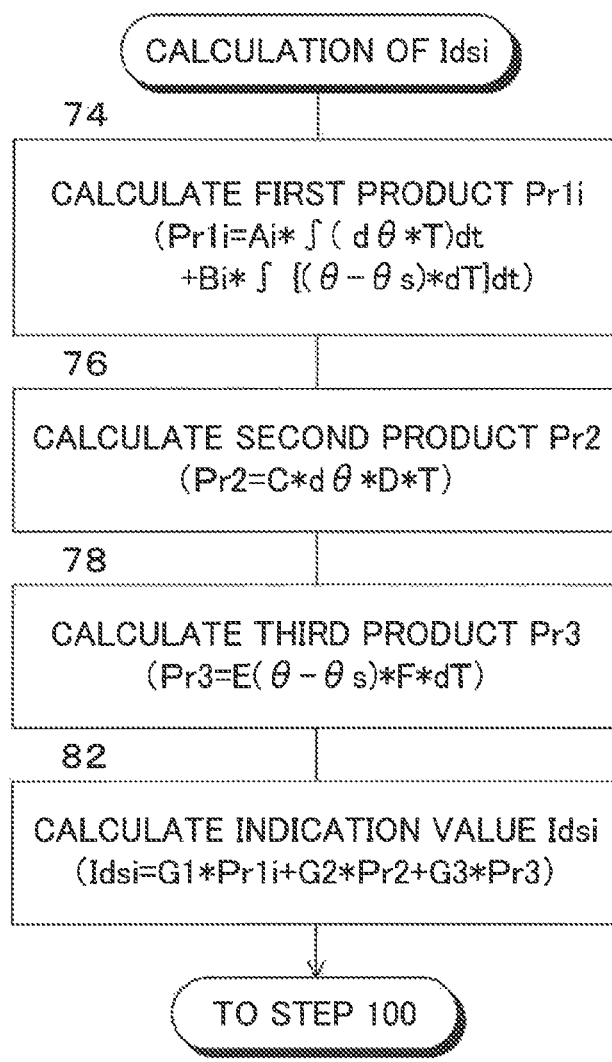
FIG. 25 is a flowchart depicting an exemplary routine for calculating the indication value Idsi according to a third modified example of the present disclosure.
Figure 26:
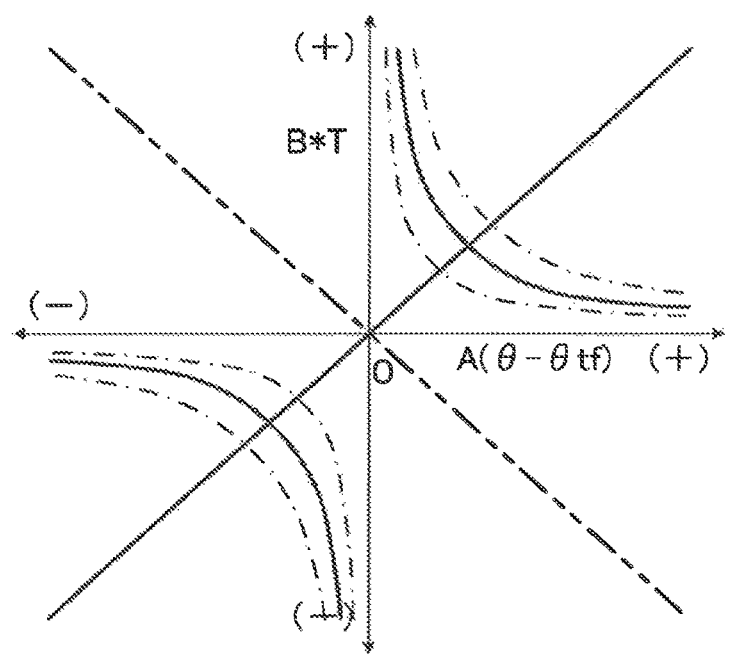
FIG. 26 is a map for determining the intention of the driver's steering operation based on the product A(θ−θtf) and a product B*T according to the second modified example.
Figure 27:
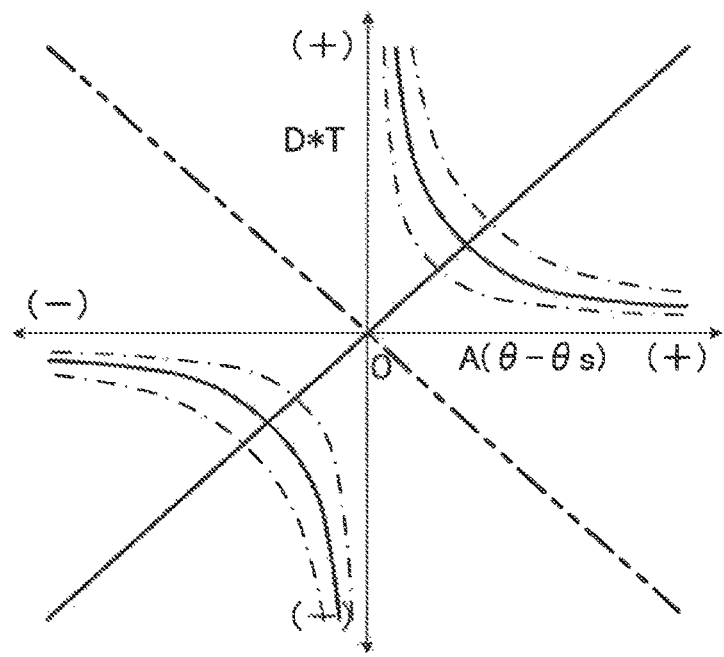
FIG. 27 is a map for determining the intention of the driver's steering operation based on the product A(θ−θtf) and the product B*T according to the third modified example.

FIG. 25 is a flowchart for illustrating an exemplary routine for calculating the indication value Idsi in the third modified example.

Step 48 is not executed in the third modified example, and thus the insufficient driving support torque Tds is not calculated. As can be understood from a comparison between FIG. 25 and FIG. 10, the routine for calculating the indication value Idsi is executed similarly to that of the third exemplary embodiment except that Steps 74 and 76 of the flowchart illustrated in FIG. 25 are executed in place of Steps 74 and 76 in the third exemplary embodiment.

In Step 74 of the third modified example, a product dθ*T and the product ((θ−θs)*dT) are each integrated and weighted, and then added to calculate a weighted sum in accordance with Expression (5) given below corresponding to Expression (4) given above as an alternative value for the first product Pr1 (A(θ−θs)*B(T−Tds)) in the first exemplary embodiment. The time period for integration is from a time at which an affirmative determination is made in Step 50 of the flowchart illustrated in FIG. 3 to the current time. The first product Pr1 does not contain the time derivative of the steering angle θ and the time derivative of the steering torque T, and thus is an indication value indicating the intention of the driver for steady-state steering. Further, at least one of the weight coefficients Ai and Bi may be 1.

$$Pr1i = Ai*\int(d\theta*T)dt + Bi*\int\{(\theta-\theta s)*dT\}dt \quad (5)$$

In Step 76, the product C*dθ of the time derivative dθ of the steering angle θ and the weight coefficient C is multiplied by the product D*T of the steering torque T and the weight coefficient D to calculate the product C*dθ*D*T as the second product Pr2. The second product Pr2 contains the time derivative dθ of the steering angle θ, and thus is an indication value indicating the intention of the driver for transitional steering. Further, at least one of the weight coefficients C and D may be 1.

In the third modified example, similarly to the case of the first and second modified examples, the insufficient driving support torque Tds is not calculated, and the insufficient driving support torque Tds is not considered in the calculation of the indication value Idsi. Thus, when there is actually the insufficient driving support torque, the accuracy of the indication value Idsi indicating the intention of the driver's steering operation is low compared to the case of the third exemplary embodiment. However, the same actions and effects as those of the third exemplary embodiment described above can be acquired except that point.

The specific exemplary embodiments of the present disclosure are described in detail above. However, the present disclosure is not limited to the above-mentioned exemplary embodiments. It is apparent for those skilled in the art that various other exemplary embodiments may be employed within the scope of the present disclosure.

Figure 28:
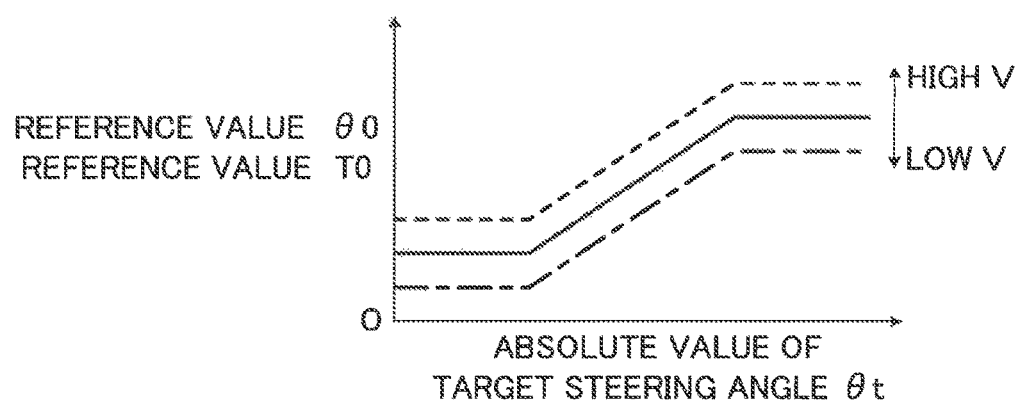
FIG. 28 is a map for calculating at least one of a reference value θ0 and a reference value T0 based on the absolute value of the low-pass filtered target steering angle θtf and the vehicle speed V.

For example, in the respective exemplary embodiments and modified examples described above, the reference value θ0 for the absolute value of the difference between the steering angles in determination of Step 50 and the reference value T0 for the absolute value of the difference between the steering torques are positive constants close to 0. However, as shown in FIG. 28, at least one of the reference value θ0 and the reference value T0 may be variably set depending on the absolute value of the low-pass filtered target steering angle θtf and the vehicle speed V.

When the vehicle is turning, the steering angle θ is more likely to change due to, for example, a disturbance from the road surface compared to when the vehicle is traveling straight ahead, and as the vehicle speed V becomes higher, the necessity for the intention of the driver's steering operation to be reflected in the target driving support torque Tdt becomes higher. In the modified examples described above, as the absolute value of the target steering angle θtf becomes larger and the vehicle speed V becomes higher, at least one of the reference value θ0 and the reference value T0 becomes larger. Therefore, it is possible to cause an affirmative determination to be more likely to be made in Step 50, to thereby cause the intention of the driver's steering operation to be more likely to be reflected in the target driving support torque Tdt.

Figure 29:
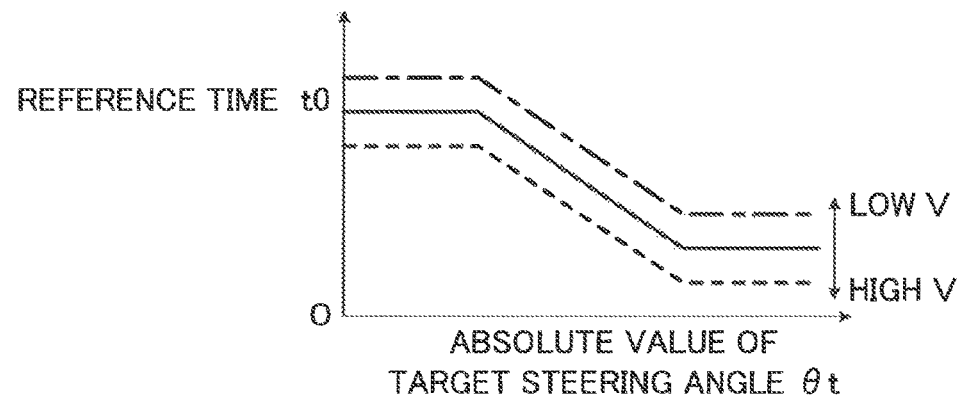
FIG. 29 is a map for calculating a time period t0 based on the absolute value of the low-pass filtered target steering angle θtf and the vehicle speed V.

Further, in the respective exemplary embodiments and modified examples described above, the time period t0 set in advance in determination of Step 50 is a positive constant. However, as shown in FIG. 29, the time period t0 may be variably set depending on the absolute value of the low-pass filtered target steering angle θtf and the vehicle speed V.

When the vehicle is turning, the steering angle θ is more likely to change compared to when the vehicle is traveling straight ahead, and thus the time period t0 may become shorter as the absolute value of the target steering angle θtf becomes larger in order to cause an affirmative determination to be more likely to be made in Step 50. Further, as described above, as the vehicle speed V becomes higher, the necessity for the intention of the driver's steering operation to be reflected in the target driving support torque Tdt becomes higher, and the time period t0 may become shorter as the vehicle speed V becomes higher in order to cause an affirmative determination to be more likely to be made in Step 50. In the modified examples described above, as the absolute value of the target steering angle θtf becomes larger, the time period t0 becomes shorter, and as the vehicle speed V becomes higher, the time period t0 becomes shorter. Therefore, it is possible to cause an affirmative determination to be more likely to be made in Step 50, to thereby cause the intention of the driver's steering operation to be more likely to be reflected in the target driving support torque Tdt.

Further, in the respective exemplary embodiments and modified examples described above, the product G1*Pr1 of the first product Pr1 and the weight coefficient G1, the product G2*Pr2 of the second product Pr2 and the weight coefficient G2, and the product G3*Pr3 of the third product Pr3 and the weight coefficient G3 are added to calculate the sum (G1*Pr1+G2*Pr2+G3*Pr3) as the indication value Idsi. However, the indication value Idsi may be any one of the product G1*Pr1 of the first product Pr1 and the weight coefficient G1, the product G2*Pr2 of the second product Pr2 and the weight coefficient G2, and the product G3*Pr3 of the third product Pr3 and the weight coefficient G3, or may be a sum of any two of those products.

As described above, the first product Pr1 is an indication value indicating the intention of the driver for steady-state steering, and the second product Pr2 and the third product Pr3 are each an indication value indicating the intention of the driver for transitional steering. Thus, when the indication value Idsi is calculated as a sum of two products, the indication value Idsi may be calculated as a sum of the product G1*Pr1 of the first product Pr1 and the weight coefficient G1 and the product G2*Pr2 of the second product Pr2 and the weight coefficient G2, or as a sum of the product G1*Pr1 of the first product Pr1 and the weight coefficient G1 and the product G3*Pr3 of the third product Pr3 and the weight coefficient G3.

Further, in the respective exemplary embodiments and modified examples, even when the magnitude of the target correction amount Δθt of the target steering angle θt is large, the target course under LKA control is not changed. However, the configuration may be modified so that, when the magnitude of the target correction amount ΔθA exceeds the reference value set in advance, the EPS control device 14 notifies the driving support control device 16 of the fact and the target course under LKA control is changed by the driving support control device 16. In this modified example, it is possible to modify the target course under LKA control earlier and more smoothly, for example, under a situation in which the vehicle is approaching a branch lane, compared to a case in which the target course under LKA control is changed based on the image information on the front field of view of the vehicle by the driving support control device 16.

In the respective embodiments and modified examples described above, a basic reference steering angle θsb is set to the steering angle θ or the target steering angle θtf acquired or calculated, respectively, when it is determined that the situation satisfying the conditions (a) and (b) or the conditions (a) and (b') given above has continued for the time period t0 or more set in advance. However, a basic reference steering angle θsb may be set to the steering angle θ or the target steering angle θtf acquired or calculated, respectively, when it is determined that the conditions (a) and (b) or the conditions (a) and (b') given above are satisfied.

In the respective embodiments and modified examples described above, in step 50, it is determined whether or not a situation satisfying the conditions (a) and (b) or the conditions (a) and (b') given above has continued for a time period t0 or more set in advance. In step 50, however, it may be determined whether or not a situation satisfying the condition (a) given above has continued for a time period t0 or more set in advance.

Further, in the respective exemplary embodiments and modified examples described above, a steering transmission ratio variable device, which rotates a steering shaft on the pinion-shaft 34 side relative to a steering shaft on the steering wheel 22 side, is not provided in the steering apparatus. However, the driving support device of the present disclosure may be applied to a vehicle in which the steering transmission ratio variable device is provided in the steering apparatus. In that case, the driving support control device 16 may calculate a target angle θpt of the pinion shaft 34 as a target value of the driving support control. Further, the target steering angle θt may be calculated as θpt−Δθr where Δθr denotes a relative rotational angle of the steering shaft on the pinion shaft 34 side with respect to the steering shaft on the steering wheel 22 side, which is produced by the steering transmission ratio variable device.

What is claimed is:

1. A driving support device for a vehicle, comprising:
   a steering angle detection device configured to detect a steering angle (θ);
   a steering torque detection device configured to detect a steering torque (T);
   a driving support control device configured to calculate a target steering angle (θt) corresponding to target steering angles of steered wheels of the vehicle for allowing the vehicle to travel along a target course;
   an electric power steering device configured to generate a steering assist torque (Ta); and
   an electric power steering control device for controlling the electric power steering device, the electric power steering control device configured to calculate a target driving support torque (Tdt) for causing the steering angle (θ) to attain the target steering angle (θt), to thereby control the electric power steering device so that a driving support torque (Td) attains the target driving support torque (Tdt),
   wherein the electric power steering control device is configured to:
   set, as a reference steering angle (θs), one of the target steering angle (θt) and the steering angle (θ) acquired when a magnitude of a difference (θ−θt) between the steering angle (θ) and the target steering angle (θt) is estimated to be less than a reference value (θ0);

calculate a corrected steering angle (θ−θs) by subtracting the reference steering angle (θs) from the steering angle (θ);

calculate an indication value (Idsi) indicating an intention of a driver's steering operation, which is correlated to at least one of a first product ((θ−θs)*T) of the corrected steering angle (θ−θs) and the steering torque (T), a second product (dθ*T) of a time derivative (dθ) of the corrected steering angle (θ−θs) and the steering torque (T), and a third product ((θ−θs)*dT) of the corrected steering angle (θ−θs) and a time derivative (dT) of the steering torque (T); and correct the target steering angle (θt) based on the indication value (Idsi) so that the target driving support torque (Tdt) is corrected in accordance with the intention of the driver's steering operation.

2. The driving support device for a vehicle according to claim 1, wherein the electric power steering control device is configured to:

calculate, based on the indication value (Idsi), a correction amount (Δθt) of the target steering angle (θt) for correcting the target driving support torque (Tdt) in accordance with the intention of the driver's steering operation; and calculate the target driving support torque (Tdt) based on a target steering angle (θta) acquired by correcting the target steering angle (θt) with the correction amount (Δθt).

3. The driving support device for a vehicle according to claim 1, wherein the indication value (Idsi) comprises a weighted sum of at least two of the first product ((θ−θs)*T), the second product (dθ*T), and the third product ((θ−θs)*dT).

4. The driving support device for a vehicle according to claim 1, wherein the electric power steering control device is configured to:

estimate an insufficient driving support torque (Tds), which corresponds to a difference between a driving support torque (Treq) required for allowing the vehicle to travel along the target course and an actual driving support torque (Td) having a magnitude of the driving support torque (Treq) or less; and calculate at least one of a corrected first product ((θ−θs)(T−Tds)), a corrected second product (dθ*(T−Tds)), and a corrected third product ((θ−θs)*dT) as alternative values for the first product, the second product, and the third product, respectively, based on a corrected steering torque (T−Tds) and the corrected steering angle (θ−θs), the corrected steering torque (T−Tds) being acquired by subtracting the insufficient driving support torque (Tds) from the steering torque (T).

5. The driving support device for a vehicle according to claim 1, wherein the electric power steering control device is configured to calculate, as an alternative value for the first product ((θ−θs)*T), a weighted sum of values acquired by integrating each of the second product (dθ*T) and the third product ((θ−θs)*dT) for a time period from a time at which the magnitude of the difference (θ−θt) between the steering angles is estimated to be less than the reference value (θ0) to a current time.

6. The driving support device for a vehicle according to claim 4, wherein the electric power steering control device is configured to calculate, as an alternative value for the corrected first product ((θ−θs)(T−Tds)), a weighted sum of values acquired by integrating each of the corrected second product (dθ*(T−Tds)) and the corrected third product ((θ−θs)*dT) for a time period from a time at which the magnitude of the difference (θ−θt) between the steering angles is estimated to be less than the reference value (θ0) to a current time.

7. The driving support device for a vehicle according to claim 1, wherein the electric power steering control device is configured to set, as the reference steering angle (θs), one of the target steering angle (θt) and the steering angle (θ) acquired when a situation in which the magnitude of the difference (θ−θt) between the steering angles is estimated to be less than the reference value (θ0) has continued for a predetermined time period or more.

8. The driving support device for a vehicle according to claim 4, wherein the electric power steering control device is configured to set, as the reference steering angle (θs), one of the target steering angle (θt) and the steering angle (θ) acquired when a situation in which the magnitude of the difference (θ−θt) between the steering angles is estimated to be less than the reference value (θ0) and a magnitude of the difference (T−Tds) between the steering torque (T) and the insufficient driving support torque (Tds) is estimated to be less than a reference value (T0) has continued for a predetermined time period or more.

9. The driving support device for a vehicle according to claim 1, wherein the electric power steering control device is configured to limit a magnitude of a time rate of change (dθs) of the reference steering angle (θs) to a limit rate of change (dθs0) or less.

10. A driving support device for a vehicle, comprising:

a steering angle detection device configured to detect a steering angle (θ);

a steering torque detection device configured to detect a steering torque (T);

a driving support control device configured to calculate a target steering angle (θt) corresponding to target steering angles of steered wheels of the vehicle for allowing the vehicle to travel along a target course;

an electric power steering device configured to generate a steering assist torque (Ta); and an electric power steering control device for controlling the electric power steering device, the electric power steering control device configured to calculate a target driving support torque (Tdt) for causing the steering angle (θ) to attain the target steering angle (θt), to thereby control the electric power steering device so that a driving support torque (Td) attains the target driving support torque (Tdt), wherein the electric power steering control device is configured to:

set, as a reference steering angle (θs), one of the target steering angle (θt) and the steering angle (θ) acquired when a magnitude of a difference (θ−θt) between the steering angle (θ) and the target steering angle (θt) is estimated to be less than a reference value (θ0);

calculate a corrected steering angle (θ−θs) by subtracting the reference steering angle (θs) from the steering angle (θ);

calculate an indication value (Idsi) indicating an intention of a driver's steering operation, which is correlated to at least one of a first weighted product (G1*Pr1) of a first weight coefficient (G1) and a first product ((θ−θs)*T) of the corrected steering angle (θ−θs) and the steering torque (T), a second weighted product (G2*Pr2) of a second weight coefficient (G2) and a second product (dθ*T) of a time derivative (dθ) of the corrected steering angle (θ−θs) and the steering torque (T), and a third weighted product (G3*Pr3) of a third weight coefficient (G3) and a third product ((θ−θs)*dT) of the corrected steering angle (θ−θs) and a time derivative (dT) of the steering torque (T); and correct the target steering angle (θt) based on the indication value (Idsi) so that the target driving support torque (Tdt) is corrected in accordance with the intention of the driver's steering operation.

11. The driving support device for a vehicle according to claim 10, wherein the indication value (Idsi) is correlated to a sum of the first weighted product (G1*Pr1), the second weighted product (G2*Pr2), and the third weighted product (G3*Pr3).

12. A method of controlling a trajectory of a vehicle, the method comprising:

detecting a steering angle (θ) using a steering angle detection device;

detecting a steering torque (T) using a steering torque detection device;

calculating a target steering angle (θt) using a driving support control device, the target steering angle (θt) corresponding to target steering angles of steered wheels of the vehicle for allowing the vehicle to travel along a target course;

generating a steering assist torque (Ta) using an electric power steering device;

calculating a target driving support torque (Tdt) using an electric power steering control device;

controlling the electric power steering device using the electric power steering control device so that a driving support torque (Td) attains the target driving support torque (Tdt) thereby causing the steering angle (θ) to attain the target steering angle (θt); and causing the electric power steering control device to:

set, as a reference steering angle (θs), one of the target steering angle (θt) and the steering angle (θ) acquired when a magnitude of a difference (θ−θt) between the steering angle (θ) and the target steering angle (θt) is estimated to be less than a reference value (θ0);

calculate a corrected steering angle (θ−θs) by subtracting the reference steering angle (θs) from the steering angle (θ);

calculate an indication value (Idsi) indicating an intention of a driver's steering operation, which is correlated to at least one of a first product ((θ−θs)*T) of the corrected steering angle (θ−θs) and the steering torque (T), a second product (dθ*T) of a time derivative (dθ) of the corrected steering angle (θ−θs) and the steering torque (T), or a third product ((θ−θs)*dT) of the corrected steering angle (θ−θs) and a time derivative (dT) of the steering torque (T); and correct the target steering angle (θt) based on the indication value (Idsi) so that the target driving support torque (Tdt) is corrected in accordance with the intention of the driver's steering operation.

13. The method of controlling a trajectory of a vehicle according to claim 12, further comprising causing the electric power steering control device to:

calculate, based on the indication value (Idsi), a correction amount (Δθt) of the target steering angle (θt) for correcting the target driving support torque (Tdt) in accordance with the intention of the driver's steering operation; and calculate the target driving support torque (Tdt) based on a target steering angle (θta) acquired by correcting the target steering angle (θt) with the correction amount (Δθt).

14. The method of controlling a trajectory of a vehicle according to claim 12, wherein the indication value (Idsi) comprises a weighted sum of at least two of the first product ((θ−θs)*T), the second product (dθ*T), and the third product ((θ−θs)*dT).

15. The method of controlling a trajectory of a vehicle according to claim 12, further comprising causing the electric power steering control device to:

estimate an insufficient driving support torque (Tds), which corresponds to a difference between a driving support torque (Treq) required for allowing the vehicle to travel along the target course and an actual driving support torque (Td) having a magnitude of the driving support torque (Treq) or less; and calculate at least one of a corrected first product ((θ−θs)(T−Tds)), a corrected second product (dθ*(T−Tds)), and a corrected third product ((θ−θs)*dT) as alternative values for the first product ((θ−θs)*T), the second product (dθ*T), and the third product ((θ−θs)*dT), respectively, based on a corrected steering torque (T−Tds) and the corrected steering angle (θ−θs), the corrected steering torque (T−Tds) being acquired by subtracting the insufficient driving support torque (Tds) from the steering torque (T).

16. The method of controlling a trajectory of a vehicle according to claim 15, further comprising causing the electric power steering control device to calculate, as an alternative value for the corrected first product ((θ−θs)(T−Tds)), a weighted sum of values acquired by integrating each of the corrected second product (dθ*(T−Tds)) and the corrected third product ((θ−θs)*dT) for a time period from a time at which the magnitude of the difference (θ−θt) between the steering angles is estimated to be less than the reference value (θ0) to a current time.

17. The method of controlling a trajectory of a vehicle according to claim 15, wherein based upon the magnitude of the difference (θ−θt) between the steering angle (θ) and the target steering angle (θt) being estimated to be less than the reference value (θ0) for a predetermined time period or more and also upon a magnitude of the difference (T−Tds) between the steering torque (T) and the insufficient driving support torque (Tds) being estimated to be less than a reference value (T0) for the predetermined time period or more, causing the electric power steering control device to set, as the reference steering angle (θs), one of the target steering angle (θt) and the steering angle (θ).

18. The method of controlling a trajectory of a vehicle according to claim 12, further comprising causing the electric power steering control device to calculate, as an alternative value for the first product ((θ−θs)*T), a weighted sum of values acquired by integrating each of the second product (dθ*T) and the third product ((θ−θs)*dT) for a time period from a time at which the magnitude of the difference (θ−θt) between the steering angles is estimated to be less than the reference value (θ0) to a current time.

19. The method of controlling a trajectory of a vehicle according to claim 12, wherein based upon the magnitude of the difference (θ−θt) between the steering angle (θ) and the target steering angle (θt) being estimated to be less than the reference value (θ0) for a predetermined time period or more, causing the electric power steering control device to set, as the reference steering angle (θs), one of the target steering angle (θt) and the steering angle (θ).

20. The method of controlling a trajectory of a vehicle according to claim 12, further comprising causing the electric power steering control device to limit a magnitude of a time rate of change (dθs) of the reference steering angle (θs) to a limit rate of change (dθs0) or less.

* * * * *